United States Patent [19]
Schmitt et al.

[11] 3,758,870
[45] Sept. 11, 1973

[54] DIGITAL DEMODULATOR

[75] Inventors: Joseph W. Schmitt; James E. Mosakowski, both of Hudson; Donald L. Starkey, Amherst, all of N.H.

[73] Assignee: Sanders Associates, Inc., Nashua, N.H.

[22] Filed: Feb. 23, 1972

[21] Appl. No.: 228,553

[52] U.S. Cl. ............... 329/104, 178/66 R, 325/320, 328/110, 328/119, 329/122

[51] Int. Cl. ............... H04l 27/22

[58] Field of Search ............... 329/104, 122; 325/30, 320, 321; 178/66, 67; 328/109, 110, 119

[56] References Cited

UNITED STATES PATENTS

| | | | |
|---|---|---|---|
| 3,423,529 | 1/1969 | O'Neill | 325/30 X |
| 3,472,960 | 10/1969 | Gutleber et al. | 178/67 |
| 3,654,564 | 4/1972 | Tisi et al. | 329/122 |
| 3,675,129 | 7/1972 | Melvin | 325/320 |
| 3,349,181 | 10/1967 | Ito | 325/30 X |
| 3,564,433 | 2/1971 | Miller | 325/320 X |
| 3,588,349 | 6/1971 | Kawai et al. | 325/320 X |
| 3,697,881 | 10/1972 | Nakagome et al. | 329/104 |

*Primary Examiner*—Alfred L. Brody
*Attorney*—Louis Etlinger

[57] ABSTRACT

A digital data demodulator for detecting binary information which is encoded upon an amplitude modulated or a phase modulated carrier wave. A specific example is presented for both a straight four phase and a modified four phase differentially coherent phase shift keyed (DCPSK) signal. The exemplary four phase DCPSK demodulator employs a discrete Fourier transform filter which provides updated Fourier coefficient values I + jQ during each sample interval. The I and Q values are rotated by 45° to form I′ and Q′ values. A synchronization network, a phase lock network and a data decoding network respond to the I, Q, I′ and Q′ values to synchronize the digital data demodulator with a received DCPSK signal and to decode the binary information encoded therein.

24 Claims, 19 Drawing Figures

DIGITAL DEMODULATOR

BACKGROUND OF INVENTION

1. Field of Invention

This invention relates to new and improved signalling apparatus and in particular to data receiver apparatus for detecting digital data signals from a data modulated signal received via a communication channel, such as a radio link, microwave link, cable or wire link and the like. The data receiver of the present invention is useful for any suitable channel bandwidth including voice grade bands.

Data signals comprise bits of information that are generally represented by amplitude levels which are constant for a period or time often called a bit period. The bit signals are arranged in data words in different permutations of a code to represent alphanumeric characters and other symbols. For a binary system, there are usually two amplitude levels, one indicative of a "1" and the other of a "0" bit value. It is convenient in data communications to refer to the "1" and "0" bit values as a "mark" and "space", respectively, in accordance with the terminology of telegraphy. When a message (a data word or group of words) is transmitted, it is customary to precede or succeed it with a code to condition the receiver to receive or not receive, as the case may be.

The transmission of digital data over voice communication channels is a significant feature of many modern electronic systems. Data processors, high speed teleprinters and other devices must frequently be interconnected over existing communication channels. Unfortunately, the characteristics of many existing voice communication circuits are not suitable for the direct transmission of digital information since such channels are generally incapable of transmitting frequency components down to and including zero frequency. For this reason, it is customary to employ a carrier signal that is modulated in either an amplitude modulatingg (AM), frequency modulating (FM) or phase modulating (PM) fashion by the digital information to be transmitted.

Of particular interest to the present invention are AM systems in which the carrier consists of different amplitude values for each bit value, and PM systems in which the carrier comprises one or more tones (frequencies) with each tone having two or more phases to represent the data bit values, frequently called phase shift keying (PSK) and mixed AM and PM systems in which the data bit values are encoded in both phase and amplitude.

2. Prior Art

Prior art demodulators have employed both analog and digital filtering techniques whereby the received modulated signal is multiplied by local reference signals to produce a product vector having inphase (I) and quadraturephase (Q) components. The I and Q vector components are then employed to decode the encoded information as well as for synchronization purposes. In these prior art demodulators, the filter operates on an integrate and dump cycle for each baud (frame or symbol) interval of the received modulated signal. A synchronization network in the demodulator must act to line up these integrate and dump cycles with the bauds of the demodulated signal. In the prior art this has been accomplished by an analog circuit which detected a dip in the carrier signal envelope. This dip signifies the midway point in the time required to change the I and Q values from one baud to the next. The information is then utilized to adjust the position in time of the integrate and dump filter cycles.

BRIEF SUMMARY OF THE INVENTION

An object of the present invention is to provide novel and improved data demodulating apparatus.

Still another object is to provide a demodulator which employs as a filter a discrete Fourier transform (DFT) network which provides valid I and Q product values for each sample of the modulated signal.

Yet another object is to provide a novel and improved I and Q vector product synchronization network.

A further object of the invention is to provide a novel and improved I and Q vector product decoding network.

Still a further object is to provide a novel and improved phase lock network for synchronizing the phases of locally generated reference signals with the phase of the modulated carrier signal.

In brief, demodulator apparatus embodying the present invention includes sampling means which samples the carrier signal so as to produce a stream of quantized carrier signal samples $f(zT)$, where $T$ is the sampling interval in the time domain and $-\infty \leq z \leq \infty$. A timing synchronization network includes an internal baud timing chain which periodically produces a baud timing signal at the baud rate of the carrier signal. The $f(zT)$ signal samples are filtered by a discrete Fourier transform filter so as to produce an $I+jQ$ product value for each value of $z$, where $I$ and $Q$ are the Fourier components. The $I$ and $Q$ components are rotated by 45° to produce $I'$ and $Q'$ components. A synchronization means responds to the $I$, $Q$, $I'$ and $Q'$ components so as to synchronize the internal baud timing chain with the bauds of the carrier signal.

In another aspect of the invention, a phase lock network responds to the $I$, $Q$, $I'$ and $Q'$ components so as to adjust the response of the filter to match the timing and phase of the carrier signal. In still another aspect of the invention, the $I$, $Q$, $I'$ and $Q'$ components are employed to decode a modified four phase DCPSK signal.

BRIEF DESCRIPTION OF THE DRAWINGS

In the accompanying drawings like reference characters denote like components.

DESCRIPTION OF PREFERRED EMBODIMENT

It is contemplated that demodulator apparatus embodying the present invention may be employed in either AM, PM or mixed AM and PM systems. However, by way of example and completeness of description, a PSK demodulator embodying the invention would be described for a system which employs four phase differentially coherent PSK (DCPSK) modulation.

Figure 2A:
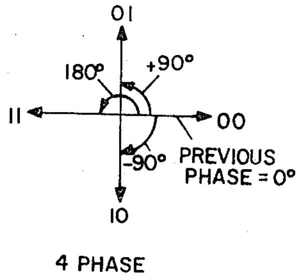
FIGS. 2A, 2B, 3A and 3B are vector diagrams which are useful to explain four phase differentially coherent PSK modulation.

In DCPSK modulation, the information is encoded on a carrier signal as a succession of phase shifts. A DCPSK signal is apportioned into baud (frame or symbol) intervals such that the succession of phase changes occur in consecutive baud intervals. In the vector diagram of FIG. 2A, the phase positions of vectors are shown for a straight four phase DCPSK encoding scheme to have phase angles of 0°, ± 90° and 180° with respect to the carrier phase which existed during the previous baud. A different pair of bit values is assigned to each of the four differential carrier phases as shown in FIG. 2A. Thus, the bit pair 00 is assigned to the phase vector at 0°; the bit pair 01, to the vector at +90°; the bit pair 11, to the vector at 180°; and the bit pair 10 to the vector at −90°.

Figure 1:
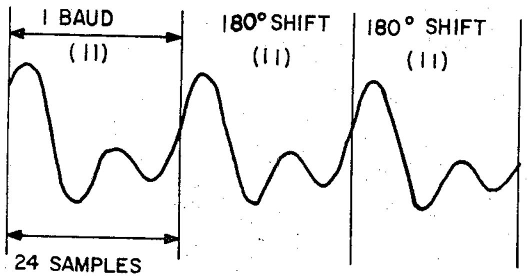
FIG. 1 is a waveform diagram of an exemplary four phase differentially coherent PSK signal which is also weighted by a raised cosine function.

The waveform shown in FIG. 1 represents three bauds of a typical four phase DCPSK signal which has been weighted by a raised cosine function. The phase of the carrier signal is shifted by +180° in each of the three bauds so as to represent the bit pattern of 11 11 11. It should be noted that a continuous bit pattern of all 0's is represented by a succession of 0 phase differentials such that the DCPSK signal becomes a continuous wave throughout the consecutive bauds during which the all 0's bit pattern is being transmitted.

Figure 3A:
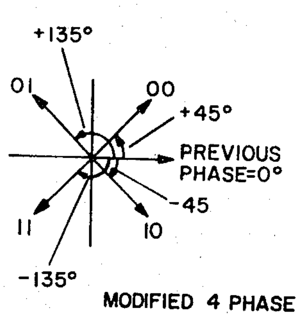

FIG. 3A is another vector diagram which shows the phase positions or vectors from a modified four phase DCPSK signal. Again, the phase which existed during the most previous baud is taken as a 0° reference. The phase vectors for the modified four phase situation are essentially the straight four phase vectors shifted or rotated by 45°. Thus, the phase angles of the 00 vector, 01 vector, 11 vector and 10 vector are +45°, +135°, −135° and −45°, respectively. This modified four phase scheme avoids the continuous wave condition which exists in straight four phase for the all 0's bit pattern.

As pointed out previously, the DCPSK signal can be demodulated by a filtering and decoding process. In the filtering step, the DCPSK signal is multiplied by local reference signals, the phases of which are in quadrature phase relative to one another, to produce a product vector of the form $I+jQ$, where $I$ and $Q$ are the inphase and quadraturephase components. The decoding stem then interprets the $I$ and $Q$ components to derive the encoded information.

Figure 2B:
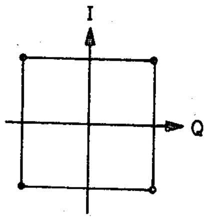

The dots in the vector diagram of FIG. 2B show the ideal positions of the $I+jQ$ product vector of a straight four phase DCPSK signal, which values occur at the optimum read or strobe times in each baud. These dots are in the form of a square and signify that the filter integration in each baud should progress until the I and Q component values are equal. The product vector can progress around the square in either direction, go across a diagonal or remain at one corner.

Figure 3B:
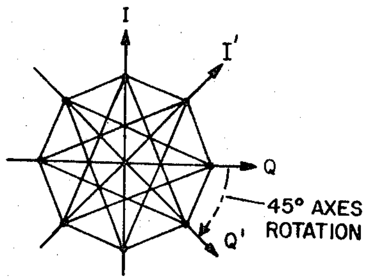

The dots in FIG. 3B show the eight possible $I+jQ$ product vector positions for a modified four phase DCPSK signal. As illustrated, the $I+jQ$ product vector can progress from any of the phase positions to any of the other phase positions which is an odd multiple of 45° away.

DEMODULATOR, GENERAL SYSTEM DESCRIPTION

Figure 4:
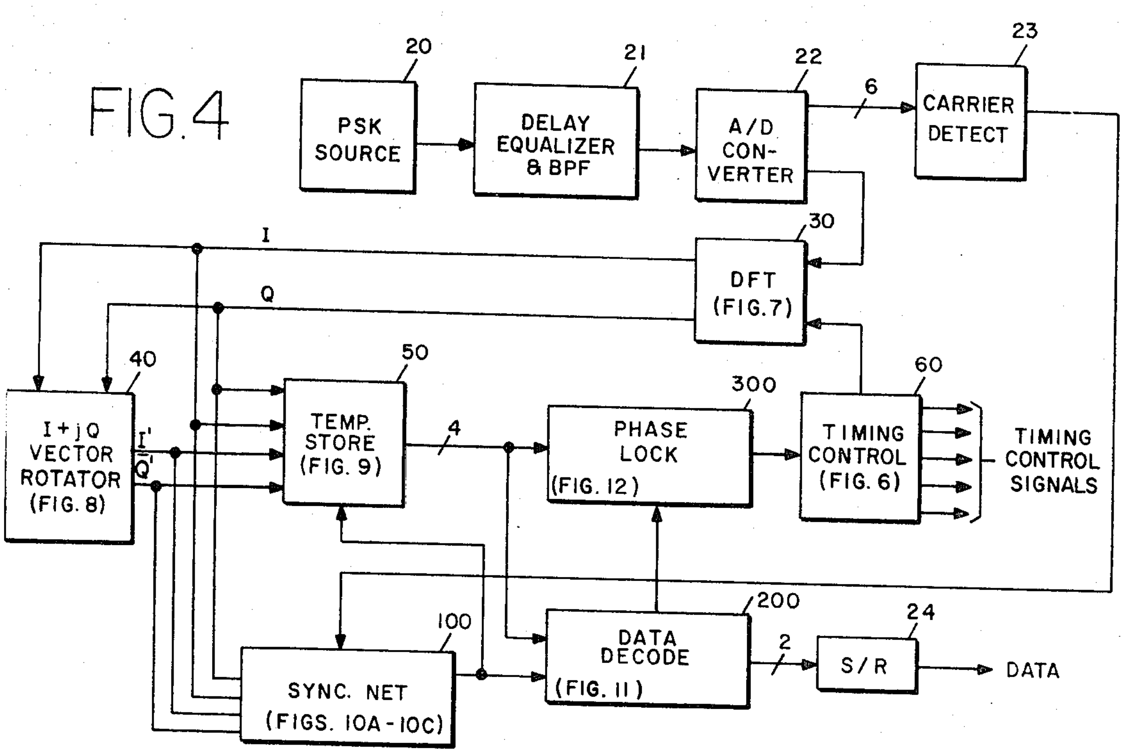
FIG. 4 is a block diagram of demodulator apparatus embodying the present invention.

A general block diagram of demodulator apparatus embodying the present invention is shown in FIG. 4 to include a signal source 20 which can provide either a straight four phase DCPSK signal (FIGS. 1 and 2A) or alternatively a modified four phase DCPSK signal (FIG. 3A). It will be appreciated that the received DCPSK signals are usually derived from a communication channel such as a wire or cable link, a microwave link, radio link and the like, with the source 20 including the necessary receiving equipment. In addition, it is to be noted that the DCPSK signal at the sending end of the channel may be DCPSK modulated by any suitable DCPSK modulator.

The DCPSK signal from the source 20 is applied to a delay equalizer network and band pass filter 21. The delay equalizer network functions in the normal manner to provide envelope delay equalization and, for example, may consist of any suitable allpass network. The bandpass filter is operative to pass all the frequencies which are expected to be in the DCPSK signal. For instance, in an exemplary 1,200 baud synchronous system the carrier frequency is 1,800 Hz. (Hertz) and bandpass filter 11 has a center frequency of 1,800 Hz. The output signal from the delay equalizer and bandpass filter block 21 may be amplified, if necessary, by means not shown and applied to an analog to digital (A/D) converter 22.

The A/D converter 22 may take the form of any suitable A/D converter which samples or time quantizes the DCPSK input signal and provides at its output signals in binary form for each input sample taken. For the purpose of the present description, it will be assumed that the A/D converter 22 is operative to time quantize the DCPSK signal at the rate of 24 samples per baud as designated in the FIG. 1 DCPSK signal waveform. Each of these time quantized samples will have a binary bit length (word length) of six bits. The entire stream of signal samples at the output of the A/D converter 22 can be expressed as $f(zT)$ where $T$ is the sampling interval in the time domain and $-\infty \leq Z \leq \infty$. The stream of signal samples $f(zT)$ is applied bit serial to a filtering device 30 which provides at its output an updated value of th product vector $I+jQ$ for each value of $z$. That is, the value of the $I+jQ$ product vector is updated for each sample of the DCPSK signal. This is to be contrasted with prior art demodulators which employed filters operable on an integrate and dump cycle. In such integrate and dump filters, a separate integration and dump operation is performed during each baud of the input signal. Since the dump command not only reads the $I$ and $Q$ values but also clears the integrators, the $I$ and $Q$ values are valid only during that one sample of each baud which coincides with the dump command.

Although the filtering device 30 may be any suitable filter, it preferably takes the form of the discrete Fourier transform (DFT) network described in the copending patent application of Joseph Schmitt and Donald Starkey, entitled Continuous Discrete Fourier Transform Method and Apparatus, Ser. No. 228,545 filed Feb. 23, 1972. For the purpose of the illustrated embodiment of the invention, the DFT filter 30 is assumed to have the Fourier integration interval $NT$, where $N=16$ samples. The DFT filter 30 will be described in more detail later on in connection with FIG. 7.

In accordance with the present invention, the updated values of the I and $Q$vector components are employed to derive the synchronization which is necessary to determine the optimum read or strobe time during each baud. Thus, the I and Q values are monitored by a synchronization network 100 for each sample of the DCPSK signal to determine the progress of a change from one to another of the vector positions shown in either FIG. 2B or FIG. 3B. For instance, in the straight four phase case the sample time during which either or both of the I and Q values are zero signifies that one half of the time required for the change in vector position has elapsed. This information is employed by the synchronization network 100 to generate a read or strobe pulse at the appropriate time during each baud (once veery 24 samples).

For the modified four phase case, the I and Q vector component values are rotated 45° by a vector rotating netowrk 40 so as to lie along the I′ and Q′ axes which are designated in FIG. 3B. The network 40 actually generates the I′ and $\overline{Q}'$ values, $\overline{Q}'$ is the complement of Q′. The synchronization network 100 monitors all four of the I, Q, I′ and $\overline{Q}'$ values and generates the read or strobe pulse at the appropriate time in each baud.

The synchronization network 100 also responds to the output of a carrier detect circuit 23 to provide a fast synch operation when the carrier is first detected. The carrier network 23 monitors the $f(zT)$ signal samples in bit parallel (as indicated by the slash mark and adjacent numeral 6 in FIG. 4) to detect the presence of signal energy.

As each I, Q, I′ and $\overline{Q}'$ value is calculated during each sample time, it is applied bit serial to both the synchronization network 100 and to a temporary store 50. The temporary store 50 is read by the read or strobe pulse once each baud (once every 24 samples). The I, Q, I′ and $\overline{Q}'$ values read from the store 50 during each baud are decoded by a data decoder network 200 to provide the binary data bits to a shift register 24. The shift register 24 is advanced or shifted at the bit rate which is 2,400 Hz. for the exemplary 1,200 Hz. baud rate.

The I, Q, I′ and $\overline{Q}'$ values read from the store 50 are further applied to a phase lock network 300. The phase lock network 300 correlates the I, Q, I′ and $\overline{Q}'$ values so as to generate a signal indicative of the direction of correction needed to synchronize the phases of the complex reference values which are employed by the DFT 30 to multiply the signal sample $f(zT)$ of the DCPSK signal. The direction correction signal is then employed to either advance or retard the timing control signals generated by a timing control 60. This in turn causes the reference value generation by the DFT 30 to either be advanced or retarded in time in the direction needed to synchronize the reference value phases with the DCPSK signal. In order to avoid cluttering of the drawing in FIG. 4, the connections of the timing control signals from timing control 60 to all of the other blocks have been omitted.

COMPONENTS

The circuit blocks shown in the remaining figures of the drawing contain known circuits which are actuated by bi-level electrical signals applied thereto. When the signal is at one level, (say, the high level) it represents the binary digit 1 and when it other at the othe level it represents the binary digit 0. Also, to simplify the discussion, rather than speaking of an electrical signal being applied to a block or logic stage, it is sometime stated that a 1 or a 0 is applied to the block or stage.

The adder, flip flop, latch, shift register, counter, one shot multiplexers and logic gates or blocks shown in the drawing may take on any suitable form. For example, these known circuits may be selected from any or all of the following catalogs: Fairchild Semiconductor Integrated Circuit Data Catalog, 1970, a catalog of Fairchild Semiconductor; the Integrated Circuits Catalog for Design Engineers, Catalog CC-401, a catalog of Texas Instruments, Inc.; and Digital 8000 Series TTL/MSI, a catalog of Signetics, Inc. of Sunnyvale, California.

Coincidence gates are represented in the drawing with the conventional AND gate symbol having a dot therein and OR gates are represented by the conventional OR gate symbol with a + contained therein. A small circle at the output of these gates represents signal inversion such that the AND and OR gates become NAND and NOR gates, respectively. When a signal flow path contains more than a single lead or conductor, a slash mark is made through the path together with an adjacent number indicating the number of conductors in the path. One final note before proceeding with the description, the signal leads have in some cases been interrupted and labeled rather than shown as continuous leads so as to avoid cluttering in the drawing.

TIMING CONTROL

Figure 5:
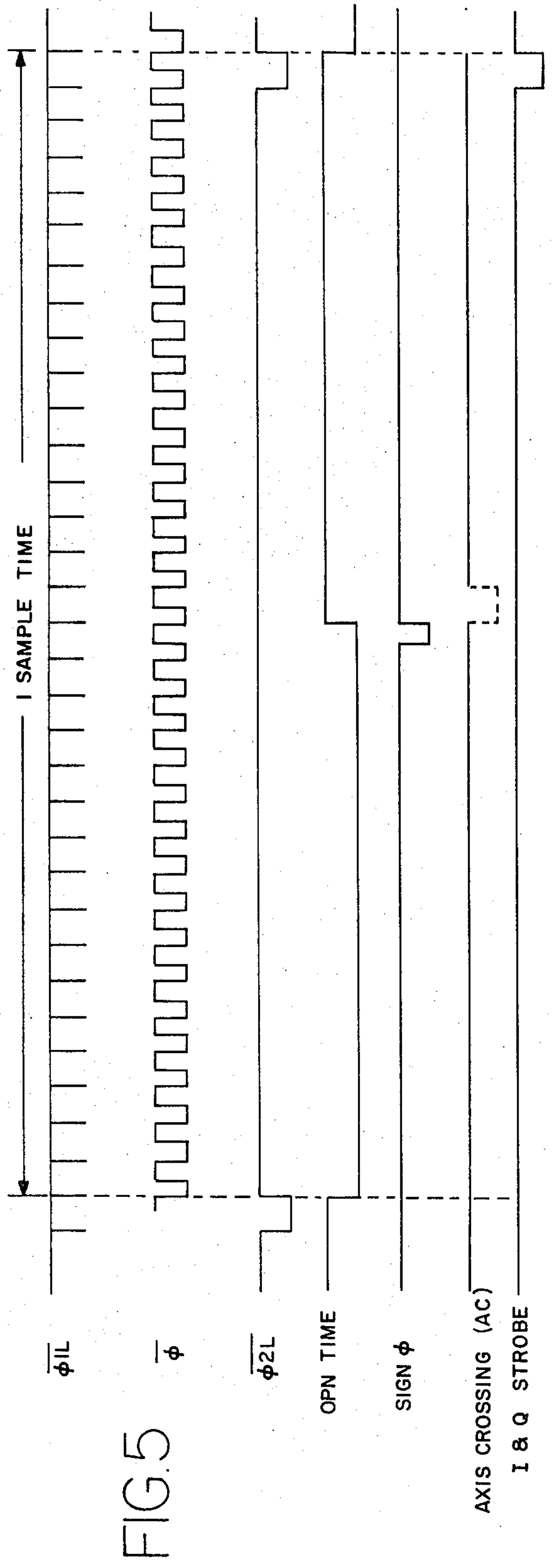
FIG. 5 is a waveform diagram showing the timing signals which are generated during each sample time by the timing control shown in FIG. 6.
Figure 6:
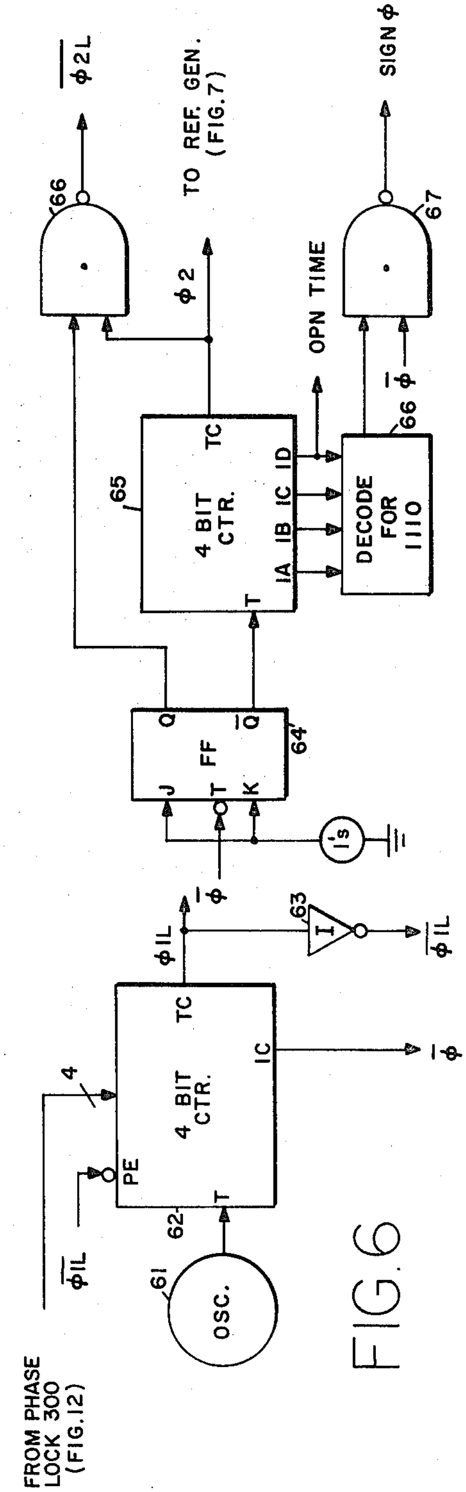
FIG. 6 is a block diagram, in part, and a logic diagram, in part, of the timing control for the FIG. 4 demodulator.

FIG. 5 shows the waveforms of the timing control signals generated during each sample time by the timing control 60 which is in turn shown in block diagram form in FIG. 6. In FIG. 6, a four bit synchronous counter 62 is operable to divide the frequency of the signal provided to its T terminal by an oscillator 61 so as to produce at its output TC a clock signal O1L. As shown in the FIG. 5 waveform diagram, $\overline{\text{O1L}}$ consists of 32 narrow pulses for each sample time, where $\overline{\text{O1L}}$ is the complement of the clock signal O1L. The signal $\overline{\text{O1L}}$ is derived by means of inverter 63 in FIG. 6. Another clock signal $\overline{\text{O}}$ having 32 cycles per sample time is further derived from the counter 62 at its third stage output 1C.

The counter 62 is further arranged to be loaded with a four bit number provided by the phase lock network 300 (FIG. 11B). This four bit number is parallel loaded into the counter 62 on the negative going excursions of the $\overline{\text{O1L}}$ signal which is applied to the parallel enable (PE) terminal of the counter. The bubble associated with the PE terminal signifies that a 0 or low going signal initiates the operation or function. The four bit number provided by the phase lock network 300 normally has a value of 1,000 (decimal 8). The counter 62 is normally operable to count from eight to 15. If the phase lock network 300 provides a phase retarding correction, the four bit number will become 0111 (decimal 7). This will cause the counter 62 to count from seven to 15 with the result that the O1L clock pulses will be delayed in time by one cycle of the oscillator 61. On the other hand, if the phase correction is to be advanced, the four bit number will become 1001 (decimal 9). Accordingly, the counter 62 will count from nine to 15 with the result that the O1L clock pulses will be advanced in time by one cycle of the oscillator 61.

The $\overline{O}$ signal is further divided by a flip flop 64 and a four bit synchronous counter 65 so as to produce at the TC output of counter 65 a signal O2 consisting of one pulse per sample time. O2 signal is applied to the reference value generator included in the DFT filter in FIG. 7. To accomplish the foregoing operation, both the J and K terminals of the flip-flop 64 are coupled to a source of 1's, which may conveniently be a positive value of voltage. The $\overline{O}$ signal is applied to the T terminal of flip flop 64. The $\overline{Q}$ output of flip flop 64 is coupled to the T input of the counter 65.

Another clock signal $\overline{O2L}$ is derived by means of a NAND gate 66 which has inputs from the TC output of counter 65 and the Q output of flip flop 64. As shown in FIG. 5 waveform diagram, the signal $\overline{O2L}$ consists of one negative going pulse having a duration of one cylce of the $\overline{O}$ signal and occurring at the end of each sample time.

A further signal, designated as operation time OPN TIME in both FIGS. 5 and 6 is derived from the last stage output 1D of counter 65. This signal has one cycle (50 percent duty) per sample time. The lower value of the OPN time signal occurs during the first 16 clock time of the $\overline{O}$ and $\overline{O1L}$ signals and serves to enable all calculations which take place in the demodulator system. It is to be noted here that the six bit samples $f(zT)$ become converted to 16 bit word lengths by the DFT filter. The 16 clock pulses which occur during the time that OPN time signal is low cause the calculations on these 16 bit words to be performed bit serial. The 16th bit in each of these words is considered to be a sign bit. A further clock signal identified as sign O in FIGS. 5 and 6 is derived from the outputs 1A, 1B, 1C and 1D of counter 65 by means of a decoder network 66 and a NAND gate 67. Since the signal sign O occurs during the 15th and 16th clock time slot within the sample time, the decoder 66 responds to the bit pattern 1110, which occurs during the 15th and 16th clock time each sample time. The NAND gate 67 serves to combine the clock signal $\overline{O}$ with the decoded or detected count value of 1110 to produce the signal sign O.

DFT FILTER

Figure 7:
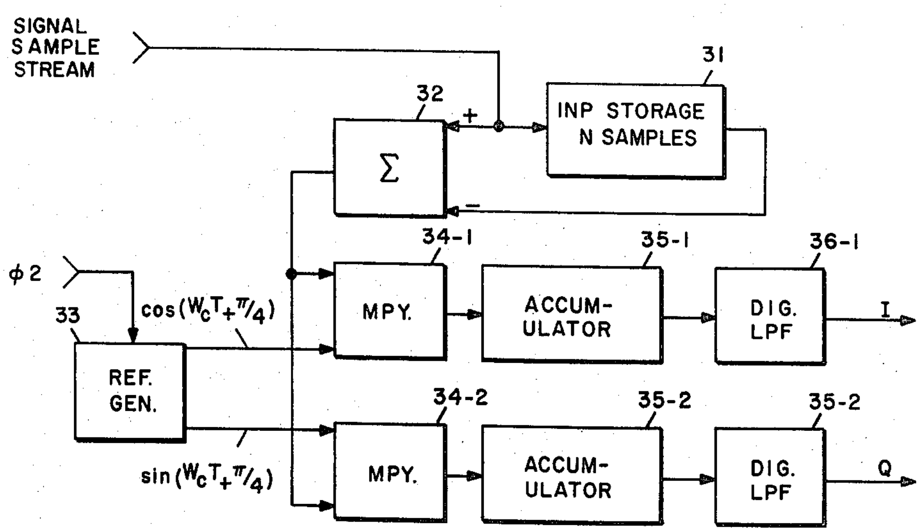
FIG. 7 is a block diagram of the DFT filtering network employed by the FIG. 4 demodulator.

The DFT network is rather completely described in the aforementioned Schmitt et al. patent application, which is incorporated herein by reference. As a matter of convenience, however, the DFT filter is illustrated in FIG. 7 and will be briefly described. DFT filter 30 initially computes the Fourier coefficient $F(k\Omega) = I + jQ$ for any sequence $f(nT)$ of the $f(zT)$ signal samples, where $-\infty \leq z \leq \infty$, and $z \leq n \leq z + N-1$, $T$ is the sampling interval in the time domain, and $\Omega$ is the chosen increment between samples in the frequency domain. Once this *DFT* integration has been performed over the Fourier integration interval *NT*, the integration sum need only be updated to calculate the *DFT* for the next integration interval which is advanced by one sample time (*T* seconds). The updating operation need consider only the new signal sample gained and the old signal lost by sliding or advancing the integration interval by one sample time. In particular during each sample time, the difference is taken between the samples $f((z+N)T)$ and $f(zT)$, which samples are *NT* apart in time, so as to provide a sequence of difference values, one for each sample time. This sequence of difference values is multiplied by a corresponding sequence of complex reference values $e^{-jk\Omega zT}$ to produce a resulting sequence of products. The products are accumulated from one sample time to another so as to provide an updated Fourier coefficient value for each value of $z$.

With reference now to FIG. 7, the DFT filter includes an input storage device 31 which delays the signal $f(zT)$ provided by the A/D converter 22 (FIG. 4) for one Fourier integration interval NT. For example, the storage device 10 may suitably be a digital shift register which is clocked or advanced at a high rate to provide a delayed $f(zT)$ signal sample in bit serial form during each sample time. An algebraic addition network 32 receives the $z$th sample from the output of the storage device 31 and the $(z+N)$th from the output of the A/D converter 22 (FIG. 4) and takes the difference therebetween to provide at its output the difference value $f((z+N)T) - f(zT)$. This is done for each value of $z$ such that there is a resulting sequence of difference values produced at the output of the addition device 32. A pair of multiplying networks 34-1 and 34-2 multiply the difference value sequence by the complex reference values $e^{-jk\Omega zT}$ provided by a reference generator 33. These reference values turn out to be sine and cosine functions since $e^{-jk\Omega zT} = \cos(K\Omega zT) + j\sin(k\Omega zT)$.

The phases of these sine and cosine reference values are locked to the phase of the DCPSK carrier signal by the phase lock network 300 (FIGS. 4, 11A and 11B) with a phase differential which is an odd multiple of 45° or $\pi/4$. In addition, since only the carrier frequency need be considered, $k\Omega = 2\pi f_c x = W_c$, where $f_c$ is the carrier signal frequency. Accordingly, the reference generator 33 responds to the O2 clock signal as phase adjusted by the phase lock network 300 to generate complex reference values of the form $\cos(W_cT + \pi/4)$ and $\sin(W_cT + \pi/4)$.

Multipliers 34-1 and 34-2 then multiply the cosine and sine reference values by the difference value sequence to produce inphase and quadraturephase products value sequences, respectively. The inphase and quadraturephase products value sequences are accumulated by means of accumulators 35-1 and 35-2, respectively so as to provide updated values of the Fourier coefficient for each value of $z$ once the Fourier integration has been performed for N samples. Digital low pass filters 36-1 and 36-2 serve to filter out the sum and difference components of the carrier frequency which results from the multiplication operations. The outputs of the digital low pass filters 36-1 and 36-2 are the inphase I and the quadraturephase Q Fourier components or product values.

These I and Q product values are in the form of sixteen bit serial words which occur during the first 16 cycles of the O clock during each sample time. Each of the multiplication, accumulation and low pass filtering operations require one sample time such that there is a one sample delay provided by each of the multipliers 34, each of the accumulators 35 and each of the low pass filters 36.

$I+jQ$ VECTOR ROTATOR

Figure 8:
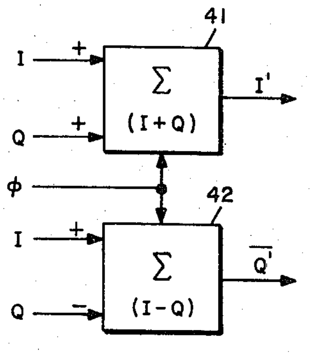
FIG. 8 is a block diagram of the I and Q axes rotator employed by the FIG. 4 demodulator.

With reference now to FIG. 8, the $I+jQ$ vector rotating network includes a pair of algebraic addition networks 41 and 42 which are arranged to take the sum ($I+Q$) and the difference ($I+Q$) to produce I′) and $\overline{Q}'$ vector components, respectively, which are rotated from the I and Q vector components by 45°. The addition networks 41 and 42 may suitably be single bit adders with a carry flip flop which is clocked by the clock signal O.

TEMPORARY STORE

Figure 9:
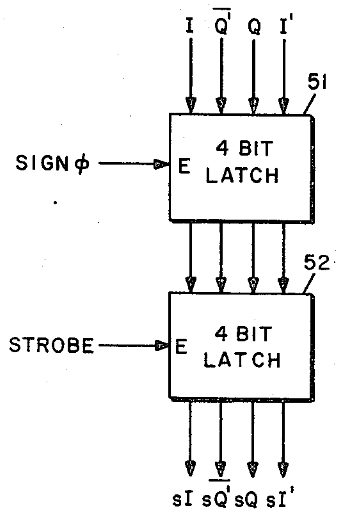
FIG. 9 is a block diagram of the temporary store employed by the FIG. 4 demodulator.

Referring now to FIG. 9, the temporary store 50 is shown to include a pair of four bit latches 51 and 52. The latch 51 is enabled at its E input by the sign O timing signal to store the sixteenth bit of each of the I, Q, I′ and $\overline{Q}'$ values during each sample time. On the other hand, the latch 52 is enabled at its E input only once every baud or 24 samples by the strobe or read signal provided by the synchronization network 100 (FIGS. 4 and 10A–10C) to receive the sign values I, Q, $\overline{Q}'$ and I′ from the latch 51. Latch 52 then functions to store these sign values for one baud or 24 samples. The outputs of the latch 52 are labeled *s*I, $s\overline{Q}'$, *s*Q and *s*I′ to indicate that these values are sign values.

SYNCHRONIZATION NETWORK

Figure 10:
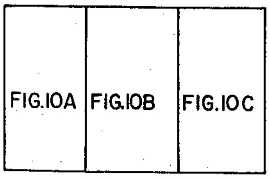
FIG. 10 is a composite showing the arrangement of FIGS. 10A, 10B and 10C.
Figure 10A:
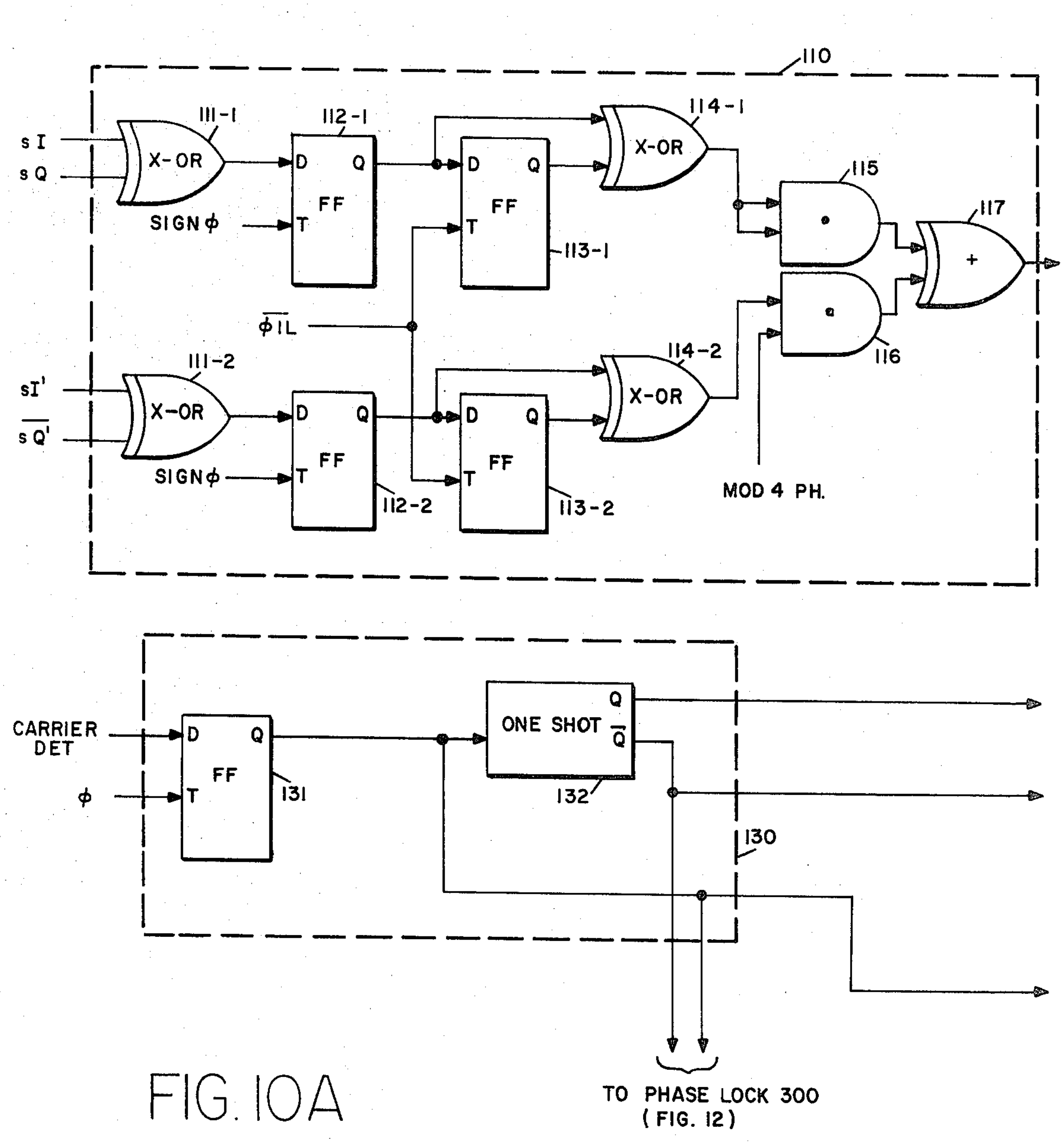
FIGS. 10A, 10B and 10C are a block diagram, in part, and a logic schematic, in part, of a synchronization network embodying the present invention.
Figure 10B:
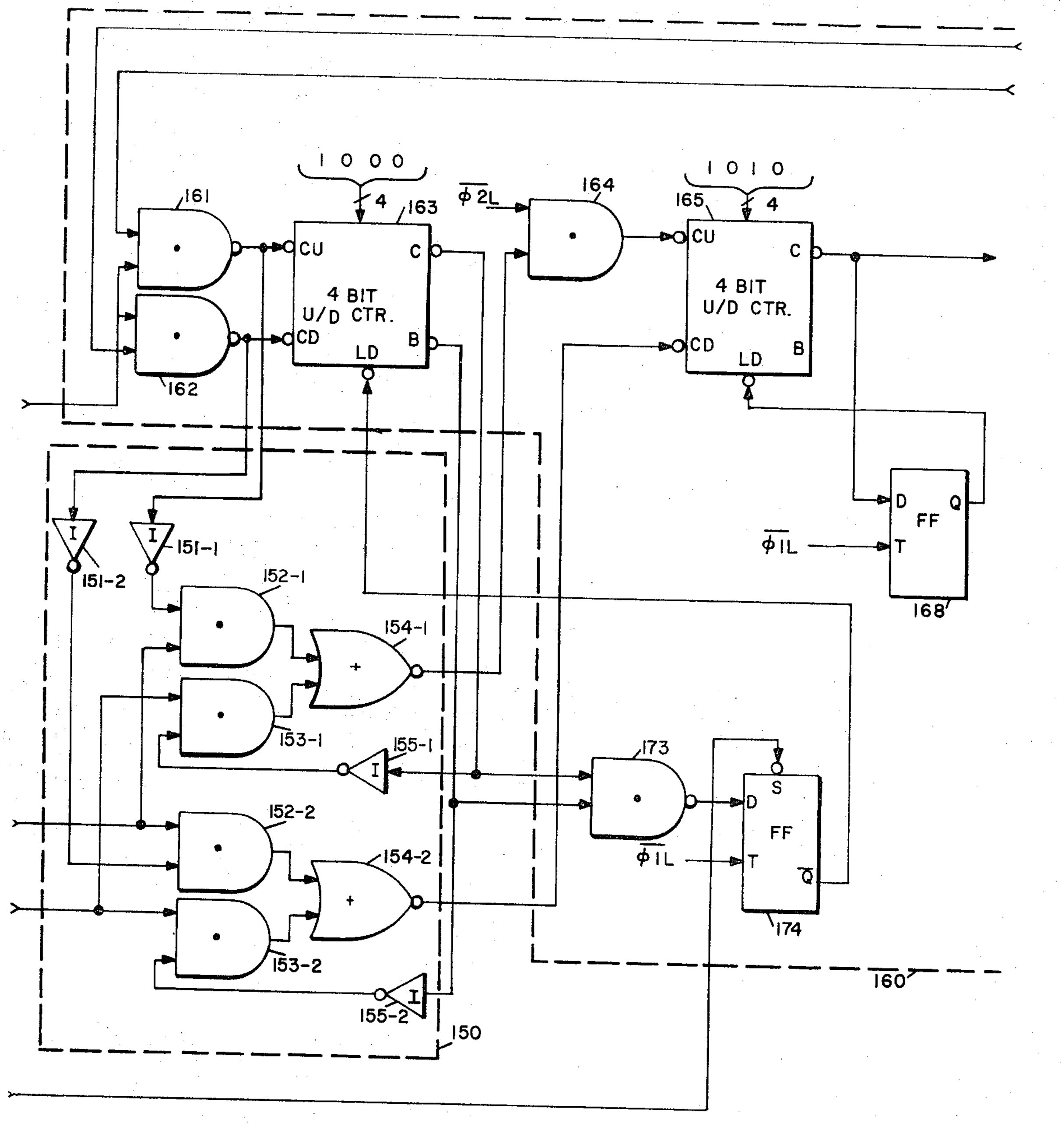
Figure 10C:
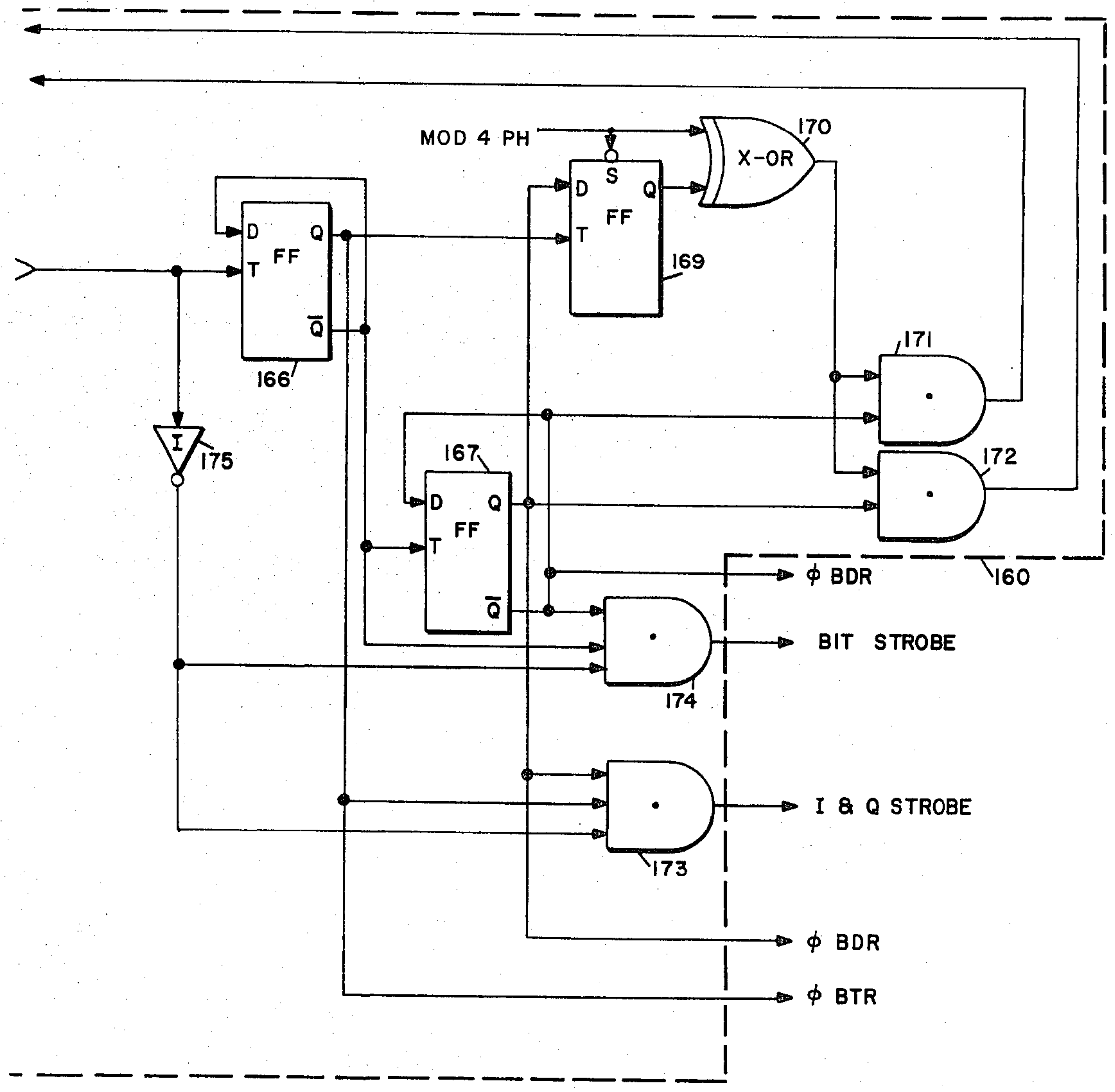

With reference now to FIGS. 10A, 10B and 10C arranged according to the FIG. 10 composite, the synchronization network 100 includes a vector axis crossing detector 110 (FIG. 10A), a sync averaging network 116(FIGS. 10B, and 10C), a fast sync control network 130 (FIG. 10A) and a fast/normal sync selection network 150 (FIG. 10B). The axis crossing detector 110 responds to the sign values *s*I, *s*Q, *s*I′ and $s\overline{Q}'$ to provide at its output an axis crossing signal AC whenever there is a change in sign from one sample calculation to the next of any of these values for the modified four phase case and of just the I and Q values for the straight four phase case. The sync averaging network 160 detects whether the AC signals are early or late relative to its internal baud timing clock which produces a data bit strobe and an I and Q vector strobe once each baud or every 24 samples. If the axis crossings are predominently early or predominently late, the strobe signal generation is adjusted to occur one sample time sooner or one sample time later, as the case may be. The fast sync control network 130 responds to the carrier detect signal to cause the sync averaging network 160 to bypass the averaging process such that the early and late axis crossing signals directly control the advancing or retarding of the baud timing clock. The selection network 150 serves to select either the fast sync or the normal sync mode.

The vector axis crossing detector 110 includes two substantially identical sections, one for correlating *s*I and *s*Q values and the other for correlating the *s*I′ and $s\overline{Q}'$ value. Corresponding circuit components in the two axis crossing sections bear like reference numerals which are hyphenated to the numeral 1 for the *s*I and the *s*Q detector and hyphenated to the numeral 2 for the *s*I′ and $s\overline{Q}'$) detector. Accordingly, only the *s*I and *s*Q detector will be described in detail.

The *s*I and *s*Q detector section includes an EXCLUSIVE OR gate 111-1 which detects a change in sign of either or both of the I and Q values which corresponds to vector position changes along the sides of the square shown in FIG. 2B. Ideally, there would be no change in state of the EXCLUSIVE OR gate 111-1 for vector position changes along the diagonals in FIG. 2B. However, due to noise and other conditions, the diagonals do not ordinarily pass directly through the origin of the I and Q axes. During each sample time, flip flop 112-1 assumes the output of the EXCLUSIVE OR gate 111-1. To this end, flip flop 112-1 has its D input connected to the output of EXCLUSIVE OR gate 111-1 and its T input connected to receive the sign O clock signal. Whenever there is a change in sign of either one or the other of the *s*I and *s*Q values, the flip flop 112-1 will change its state in response to the next ensuing sign O clock pulse (at the end of the 16th cycle of the $\overline{\text{O1L}}$ signal). Another EXCLUSIVE OR gate 114-1 correlates this detected axis crossing with the one which occurred during the previous baud. To this end, EXCLUSIVE OR gate 114-1 responds to the Q outputs of flip-flop 112-1 and of another flip flop 113-1. Flip flop 113-1 serves to store a detected axis crossing for one sample time. To this end, flip flop 113-1 has its D input connected to the Q output of flip flop 112-1 and its T input connected to receive the $\overline{\text{O1L}}$ clock pulses. Accordingly, whenever the flip flop 112-1 changes state, the flip flop 113-1 follows or assumes the same state upon the occurrence of the next ensuing $\overline{\text{O1L}}$ clock pulse. This results in the axis crossing signal at the output of EXCLUSIVE OR gate 114-1 having a pulse width equal to one cycle of the O1L and occuring during the 17th cycle of the O1L signal as shown in FIG. 5. The axis crossing pulse is shown by dotted lines in FIG. 5 so as to indicate that the axis crossing pulse does not occur during every sample period. Since the Q outputs of flip flops 112-1 and 113-1 normally have the same output value, the output of the EXCLUSIVE OR gate 114-1 will normally be a zero. Whenever the flip flop 112-1 does change its state, the output of EXCLUSIVE OR gate 114-1 will become a one until the occurrence of the next ensuing $\overline{\text{O1L}}$ clock pulse.

For the modified four phase case, the axis crossings of both the I and Q and I′ and $\overline{Q}'$ axes are employed by the sync averaging network 160. However, for the straight four phase case only the I and Q axis crossings are employed. To this end, the I′ and $\overline{Q}'$ axis crossing signal is coupled from the output of EXCLUSIVE OR gate 114-2 to one input of an AND gate 116, the other input of which is connected to receive a modified four phase mode signal. This mode signal may be derived, for example, by means of a jumper wire which is connected to a source of 0's (circuit ground) for the straight four phase case and to a source of 1's (positive voltage) for the modified four phase case. The output of EXCLUSIVE OR gate 114-1 is connected to both inputs of another AND gate 115 so as to match the signal propagation delay of the AND gate 116. The outputs of the AND gate 115 and 116 are then coupled via an OR gate 117 to the sync averaging circuit 160 as the axis crossing signals AC.

The sync averaging network 160 (FIGS. 10B and 10C) includes early and late AND gates 161 and 162, both of which receive the AC axis crossing signals from OR gate 117, an early/late averaging counter 163 and a baud timing clock, all of which are connected in a loop. The baud timing clock includes a four bit up/-down counter 165 (FIG. 10B) and a pair of D type flip flop 166 and 167 (FIG. 10C) all connected in cascade to form a frequency division circuit which divides the $\overline{O2L}$ timing signal by 24. The $\overline{O2L}$ signal is shown in FIG. 5 to have one negative going excursion at the end of each sample time. The $\overline{O2L}$ signal has also been reproduced in FIG. 12 with a compressed time scale for one baud or 24 samples.

The $\overline{O2L}$ signal is applied by way of a normally enabled AND gate 164 to the count up CU input of the counter 165. The counter 165 is arranged to divide the frequency of the $\overline{O2L}$ signal by 6 while each of the flip flops 166 and 167 are arranged as divide by two networks. To this end, counter 165 is forced to count from 1010 (decimal 10) to 1111 (decimal 15) by means of a flip flop 168 which causes the 1010 pattern to be parallel loaded in response to the counter attaining the all 1's condition. Accordingly, flip flop 168 has its T terminal connected to the C ouptut of counter 165, its Q output connected to the load LD terminal of counter 165 and its T terminal connected to receive the $\overline{O1L}$ timing signal. The 1010 bit pattern is shown to be permanently connected for parallel entry into the counter 165 whenever the C output thereof goes to 0. This forces flip flop 168 to switch upon the next ensuing $\overline{O1L}$ pulse so as to apply a 0 to the LD input of the counter. Once the parallel entry has been achieved, the C output of the counter will become a 1 and the flip flop 168 will be triggered back on the next ensuing $\overline{O1L}$ pulse to its initial condition.

Each of the flip flops 166 and 167 are arranged as divide by two circuits by connecting their respective $\overline{Q}$ outputs to their respective D inputs. The C output of counter 163 is coupled to the T input of flip flop 166. The $\overline{Q}$ output of flip flop 166 is in turn connected to the T input of flip flop 167. The Q output of flip flop 166 provides the bit rate clock $O_{BTR}$ which for the present example is 2,400 Hz. The 1,200 Hz. baud rate clock $O_{BDR}$ signal is then taken from the Q output of flip flop 167. Th complement $\overline{O}_{BDR}$ is taken from the $\overline{Q}$ output of flip flop 167.

Figure 14:
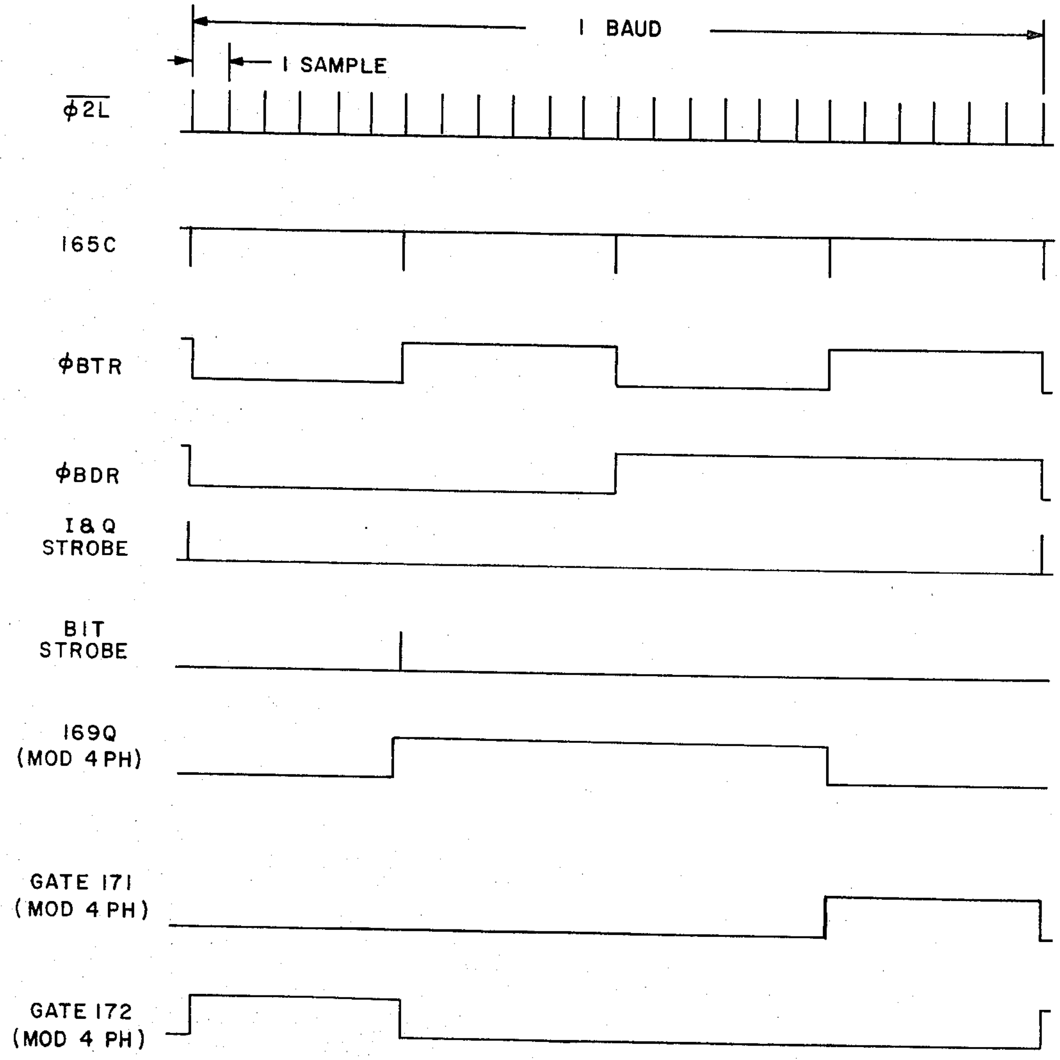
FIG. 14 is a waveform diagram showing various signals employed by the FIG. 10 and FIG. 11 networds.

The waveform of the C output of counter 165 (165C) and the $O_{BTR}$ and $O_{BDR}$ signals are shown for one baud in FIG. 14. An AND gate 173 (FIG. 10D) responds to the $O_{BTR}$ and $O_{BDR}$ signals and to the complement of the 165C waveform (as derived by inverter 175) to produce the I and Q strobe at the end of the 24th sample during each baud. Another AND gate 174 responds to the complements $\overline{O}_{BDR}$, $\overline{O}_{BTR}$ and the complement of the 165C signal to produce the data bit strobe at the end of the sixth sample during each baud. The axis crossing AC signals control the synchronization of the baud timing clock with the received DCPSK signal by either advancing or retarding the generation of the I and Q strobe and the bit strobe. The generation of the strobes is advanced by inserting extra pulses in the pulse stream applied to the count up CU input of the counter 165. On the other hand, the generation of the strobes is retarded by applying pulses to the count down CD terminal of the counter 165. For each such corrective pulse, the strobe generation is either advanced or retarded, as the case may be, by one sample.

The axis crossing AC signals are first tested by the early and late gates 161 and 162 to determine whether they occur early or late relative to the timing of the baud clock. For the straight four phase case, the early AND gate 161 is enabled and the late AND gate 162 is disabled for the first 12 samples of the baud timing clock cycle. Then for the second 12 samples of the baud clock timing cycle, the early gate 161 is disabled and the late gate 162 is enabled. That is, an AC signal is early if it occurs during the first 12 samples and is late if it occurs during the second 12 samples of a baud. This is accomplished by coupling the $\overline{Q}$ and Q outputs of flip flop 167 (FIG. 10C) via normally enabled (for the straight four phase case) AND gates 171 and 172 to the early and late gates 161 and 162, respectively.

For the modified four phase case the early/late test is different since there can be more than one axis crossing per baud. For instance, a vector position move in FIG. 3B from the dot on the positive Q axis to the dot on the negative I' axis will first cross the Q' axis and then cross the I axis. If the straight four phase test (early in the first twelve samples and late in the second 12 samples) is applied to this situation, there would be both an early and a late axis crossing since the Q' axis crossing occurs prior and the I axis crossing occurs after the twelfth sample. In other words, there would be no useful sync information since the early and late axis crossing would effectively cancel one another.

The procedure employed is to test only during first and fourth quarters of the baud timing cycle. If an axis crossing occurs during the fourth quarter, it is early and if it occurs during the third quarter, it is late. If axis crossings occur during both the fourth and first quarters, the baud timing clock is in synchronization with the DCPSK signal and the early and late axis crossings cancel one another out.

This early/late test for the modified four phase case is accomplished by employing a flip flop 169 to shift the phase of the $O_{BDR}$ signal by 90° one fourth of a baud timing cycle) so as to set up the testing window for the first and fourth quarters of the baud cycle. Flip flop 169 has its D input connected to the Q output of flip flop 167 and its T input connected to the Q output of flip flop 166. Flip flop 169 is inhibited in the straight four phase case by having a 0 applied to its S (set) terminal. This forces the Q output of flip flop 169 to be at 1 at all times.

The waveform of the Q output (169Q) of flip flop 169 is shown in FIG. 14 for the modified four phase case. The EXCLUSIVE OR gate 170 (FIG. 10C) essentially acts as an inverter in the modified four phase case to invert the 169Q waveform which is then employed to enable the AND gate 171 and 172 during the fourth and first quarters and disable them during the second and third quarters of each baud. As shown in FIG. 14, the output of gate 171 is a 1 only during the fourth quarter of a baud so as to enable the early gate 161. On the other hand, the output of gate 172 is a 1 only during the first quarter of a baud so as to enable the late gate 162.

The early axis crossing signals are applied by the early gate 161 to the count up (CU) input of the averaging counter 163. On the other hand the late axis crossing signals are applied by the late gate 162 to the count down CD terminal of the counter 163. The counter 163 acts to average the early and late axis crossings over several bauds and issues advance or retard pulses only if the axis crossings are predominantly early or late. For the present example, the counter 163 is arranged to count from 1,000 (decimal eight) to either 0000 (decimal zero) or 1111 (decimal 15). To accomplish this, the C and B outputs of counter 163 are connected to a NAND gate 173. The C output of counter 163 becomes a 0 only at the count of 15 (all 1's) and is a 1 at all other times. On the other hand, the B output of counter 163 becomes a 0 only at the count of 0 (0000) and is a 1 at all other times. Accordingly, NAND gate 173 normally has a 0 at its output which becomes a 1 when the counter attains either the count of 8 or the count of 15. A D type flip flop 174 has its D input connected to the output of NAND gate 173, its T input connected to receive the $\overline{O1L}$ clock signal and its $\overline{Q}$ output connected to the load LD terminal of the counter 163. The S input of flip flop 174 is connected to the output of a carrier detect flip flop 131 (FIG. 10A) included in the fast sync control circuit 130. Although the carrier detect flip flop 131 will be described later on, suffice it to say here that its Q output is a 1 whenever the carrier signal is detected by the carrier detector 23 (FIG. 4) and is a 0 when the carrier signal is not present. Accordingly, during the normal operation of the mode there will be a one applied to the set input of flip flop 174 so as to enable it to respond to the output of NAND gate 173. When the output of NAND gate 173 becomes a 1 in response to either count 0 or count 15 being attained by counter 163, flip flop 174 will change its state in response to the next ensuing $\overline{O1L}$ clock pulse such that its $\overline{Q}$ output will apply a zero to the LD terminal counter 163. This causes the counter 163 to be parallel loaded with the bit pattern 1000 which may be derived from permanent sources of 0's and 1's. Once the parallel entry of the bit pattern has been achieved, the C or B terminal, as the case may be, returns to the 1 state causing the output of NAND gate 173 to return to the 0 state. On the next ensuing $\overline{O1L}$ clock pulse the flip flop 174 will then be switched back to its original state where its $\overline{Q}$ output applied a 1 to the LD input of counter 163.

The C and B outputs of the counter 163 represent averaged early and late axis crossings and are employed during normal sync to advance or retard the baud timing clock. On the other hand, during the fast sync mode the early and late axis crossing signals at the outputs of NAND gates 161 and 162 are directly employed to advance and retard, respectively, the baud timing clock. The fast sync mode is entered into when the carrier signal is first detected by the carrier detector 23 in FIG. 4. When the carrier signal is detected, carrier detector 23 emits a 1 which is applied to flip flop 131 which is included in the fast sync control network 130. The flip flop 131 then switches in response to the next ensuing O clock pulse such that its Q output becomes a 1. The 01 transition at the Q output of flip flop 131 triggers a one shot multivibrator 132. The one shot 132 has a time constant of about 30 bauds during which its Q and $\overline{Q}$ outputs cause the sync mode select circuit 150 to couple the early and late axis crossing signals directly from the early and late gates 161 and 162 to the baud timing clock. The $\overline{Q}$ output of the one shot 132 and the Q output of flip flop 131 are also coupled to the phase lock network 300 in FIG. 12.

The sync mode select network 150 includes two substantially identical gating sections, one for gating the advance pulses and the other for gating the retard pulses. Corresponding components in each of these gating sections bear the same reference character which is hyphenated to a one for the advance pulse gating section and hyphenated to a two for the retard pulse gating section. Accordingly, only the advance gating section will be described in detail.

The advance pulse gating section includes a pair of AND gates 152-1 and 153-1 which receive the Q and $\overline{Q}$ outputs, respectively, from the one shot 132 (FIG. 10A). During the fast sync mode, the Q and $\overline{Q}$ outputs of one shot 132 are 1 and 0, respectively, such that AND gate 152-1 is enabled and AND gate 153-1 is disabled. This causes gate 152-1 to pass the axis crossing signals received from the output of gate 161 via an inverter 151-1 to its output. On the other hand, during the normal sync mode the Q and $\overline{Q}$ outputs of one shot 132 are 0 and 1, respectively, and thereby enabling gate 153-1 to pass the averaged early axis crossing signal received from the C output of counter 163 via inverter 155-1 to its output. The outputs of the two AND gates 152-1 and 153-1 are then applied via a NOR gate 154-1 to the AND gate 164. In the absence of an axis crossing pulse, the fast sync mode or an averaged early axis crossing signal (normal sync), the output of NOR gate 154-1 is a 1. This causes AND gate 164 to be normally enabled so as to pass the $\overline{O2L}$ clock signal which occurs at the end of each sample time. On the other hand, the axis crossing signals occur at approximately the middle of a sample interval (during the 17th cycle of the $\overline{O1L}$ clock signal). Thus, the output of NOR gate 154-1 goes to 0 at a time which is substantially mideway between the $\overline{O2L}$ clock pulses. The AND gate 164 will therefore be enabled to pass the advance pulses from the NOR gate 154-1 to the count up CU input of counter 165.

The NOR gate 154-2 in the retard pulse gating section has its output connected directly to the count down CD input of the counter 165.

PHASE LOCK NETWORK

Figure 12:
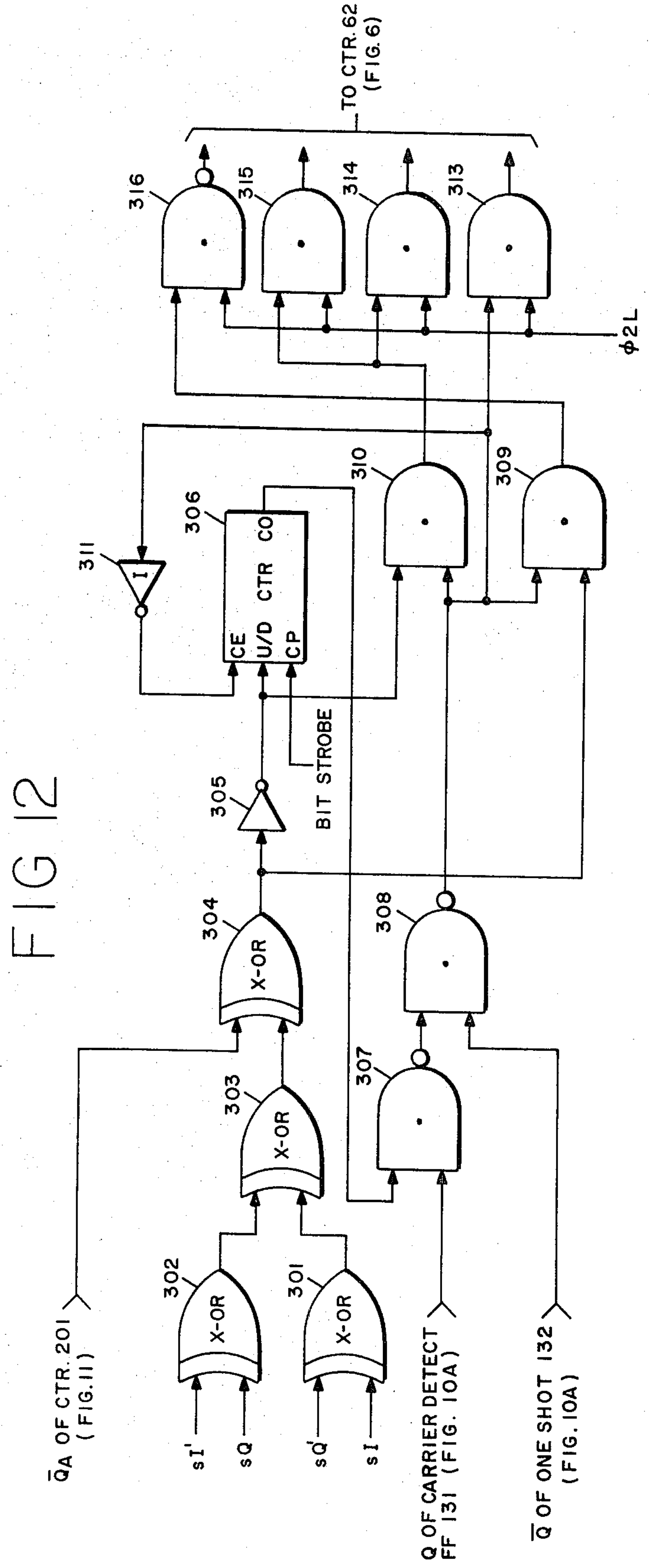
FIG. 12 is a block, in part, and a logic schematic, in part, of a phase lock network embodying the present invention.
Figure 13:
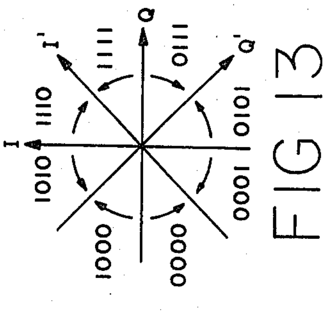
FIG. 13 is a plot which is helpful in understanding the phase lock network of FIG. 12.

With reference now to FIGS. 4, 12 and 13, the phase lock network 300 responds to the sign values $sI$, $sQ$, $sI'$ and $\overline{sQ'}$ to generate a direction correction code which is employed by the timing control (FIG. 6) to advance or retard the phases of the DFT reference signal so as to achieve synchronization with the received DCPSK signal. The reference signal phases are considered to be in synchronization with the phase of the DCPSK signal when $|I| = |Q|$. This condition of magnitude equality of I and Q essentially requires the reference signal phase to be an odd multiple of 45° away from either the I or Q axis. In other words, reference signal phase is in alignment with the I' and Q' axes.

The technique employed to detect the direction in which the reference signal phase needs to be corrected is best explained with the aid of the plot of FIG. 13 in which the I and Q and I' and Q' axes define eight sections or octants. An $I + jQ$ vector can lie in any one of these octants. The arrows in each octant indicate that the direction of correction is the same in alternate octants (every other octant). Thus, the direction of correction is clockwise for a vector which lies in the +I and +I' octant, the +Q and $+\overline{Q}'$ octant, the −I and −I' octant and the −Q and $-\overline{Q}'$ octant. The direction of correction required in all the other octants is counter clockwise. If the plus and minus signs of the I, Q, I' and $\overline{Q}'$ values are assigned binary digits 1 and 0, respectively, it turns out that an odd number of 1's for a given vector requires a clockwise correction and that an even number of 1' s including zero 1's requires a counter clockwise correction. For example, the 1110 code shown in the I and I' octant requires a clockwise correction and the 1111 code shown in the I' and Q octant requires a counter clockwise correction.

Referring now to the FIG. 12 diagram of the phase lock network 300, the test for an odd or even number of 1's in the sign values $sI'$, $sQ$, $s\overline{Q}'$ and $sI$ is performed by three EXCLUSIVE OR gates 301, 302 and 303 which act to take the modulo two sum of all of these values. Thus, EXCLUSIVE OR gate 301 takes the modulo two sum of the values $sI$ and $s\overline{Q}'$ and gate 302 takes the modulo two sum of the values sQ and sI'. Finally the EXCLUSIVE OR gate 303 takes the modulo two sum of the outputs of gates 301 and 302. The output of EXCLUSIVE OR gate 303 is 0 and 1 for odd and even numbers, respectively, of 1's among the $sI'$, $sQ$, $s\overline{Q}'$ and $sI$ values.

The output of EXCLUSIVE OR gate 303 directly represents the direction of correction required for the straight four phase case (1 for counter clockwise and 0 for clockwise). For the modified four phase case, this value must be complemented during alternate bauds (every other baud) in order to adjust for the 45° phase shift in the modified four phase DCPSK signal. Accordingly, another EXCLUSIVE OR gate 304 correlates the output of EXCLUSIVE OR gate 303 with the $\overline{Q_A}$ output of a counter 201 (FIG. 11) included in the data decoder network 200. This $\overline{Q_A}$ signal is a 0 in the straight four phase mode such that the EXCLUSIVE OR gate 304 passes the signal from the output of gate 303 without change. For the modified four phase case, the $\overline{Q_A}$ signal alternates between one and zero on consecutive bauds so as to cause the gate 304 to complement the correction signal at the output of gate 303.

The output of gate 304 is applied directly to a NAND gate 309 and via an inverter 305 to an AND gate 310. The gates 309 and 310 are part of an encoder which also includes AND gates 313, 314 and 315 and a NAND gate 316. This encoder serves to encode the direction correction signal into a four bit code which is parallel entered into the counter 62 in the timing chain of the timing control 60 in FIG. 6. The encoder gates are arranged to normally generate the code of 1000 (decimal 8) and, when a phase correction is required, to generate either the code 0111 (decimal 7) or the code 1001 (decimal 9) for clockwise and counter clockwise phase corrections, respectively. As explained previously, this has a net effect of causing the counter 62 to normally count from eight to 15 and to count from seven to 15 or from nine to 15 when it is required to retard the phase of the reference signal, respectively.

These phase corrections are determined once each baud during a fast phase lock mode and on an averaged basis during a normal phase lock mode. For the fast phase lock mode, the $\overline{Q}$ output of one shot 132 (FIG. 10A) is applied to a NAND gate 308. As pointed out previously, this $\overline{Q}$ output of one shot 132 is a 0 for the first 30 bauds after the carrier is first detected. This causes the output of NAND gate 308 to be a 1 so as to enable the gates 309 and 310 during the entire fast phase lock interval.

For this fast phase mode, the encoder gates will produce the code 1000 during the first 31 cycles of counter 62 in each sample time. During the 32nd cycle, the O2L timing signal will sample the gates 313 through 316 so as to cause either the code 0111 or the code 1001 to be generated. That is, a phase correction is generated once each sample time or 24 times a baud during the fast sync mode.

During the first 31 cycles of counter 62 in each sample time, the O2L signal is a 0 such that the outputs of gates 313, 314 and 315 are 0's and the output of NAND gate 316 is a 1. During the 32nd cycle, the 02L signal is a 1 so as to enable all of the gates 313 through 316. If the direction of correction (output of gate 304) is 0 for counter clockwise correction, the output of gates 309 and 310 will both be 1's. This will cause the outputs of gates 313, 314 and 315 to become 1's and the output of gate 316 to become a 0. On the other hand, if the direction correction signal is a 1 for counter clockwise phase correction, the outputs of gates 309 and 310 will both be 0. This will cause the outputs of gates 313 and 316 to be 1's and the outputs of gates 314 and 315 to be 0's.

After the fast sync mode is over (one shot 132 in FIG. 10A returns to its quiescent condition), the phase lock network 300 enters a normal phase lock mode. During this mode the direction correction signals are averaged over a number of bauds such that a phase correction is instituted only if the phase offset is predominantly in one direction or another. To this end, the output of the inverter 305 is applied to the up/down U/D count direction input of a counter 306 which may suitably have 4 stages. The counter 306 is clocked by the bit strobe signal which is applied to its CP terminal. The $C_0$ output of the counter 306 becomes a 1 for an interval of 24 samples from one bit strobe to the next when either the all 1's or the all 0's state is attained and is a 0 at all other times. The $C_0$ output of counter 306 is applied to a NAND gate 307 which has its output connected to NAND gate 308. The other input to NAND gate 307 is derived from the Q output of the carrier detect flip flop 301 in FIG. 10A. This Q output is a 1 whenever the carrier is detected so as to enable gate 307 to respond the $C_0$ output and the 306. The output of NAND gate 307 thus becomes a 0 only when counter 306 attains the all 1's state or the all 0 state and is a 1 at all other times. This in turn causes the output of NAND gate 308 to be a 0 at all times until the counter 306 attains either the all 1's state during the normal phase lock mode.

The encoder gate will still generate the 1000 code during the first 31 cycles of the counter 62 (FIG. 6). For the case where the $C_0$ output counter 306 is a 0 (no phase correction required) the outputs of gate 308 and 310 will be 0's and the output of gate 309 will be a 1. This will cause the gates 313, 314, 315 and 316 to again generate the 1000 code during the 32nd cycle of counter 62 when they are strobed by the O2L signal. On the other hand, whenever the counter 306 attains either the all 0's or the all 1's state, the output of gate 308 will be a 1 so as to enable gates 309 and 310. This in turn will cause the encoder gate to generate either the code 0111 or the code 1001 for a phase correction in the manner described before.

An inverter 311 connected between the output of gate 308 and the count enable CE input of counter 306 causes the counter to be disabled whenever the output of gate 308 is a 1, namely, continuously during the fast sync mode and during the counter output pulse interval in the normal sync mode.

DATA DECODE NETWORK 200

A modified four phase DCPSK signal essentially consists of a straight four phase signal which is phase shifted by 45°. That is, a differential phase of 0° in straight four phase is equivalent to a differential phase of 45° in modified four phase; a differential phase of 90° in straight four phase is equivalent to a differential phase of 135° in modified four phase; and so on. The data decode network 200 is operative for a modified four phase DCPSK signal, to strip the 45° phase shift component from the signal so that the same decoding network can be used for both the straight four phase and the modified four phase signals.

Figure 11:
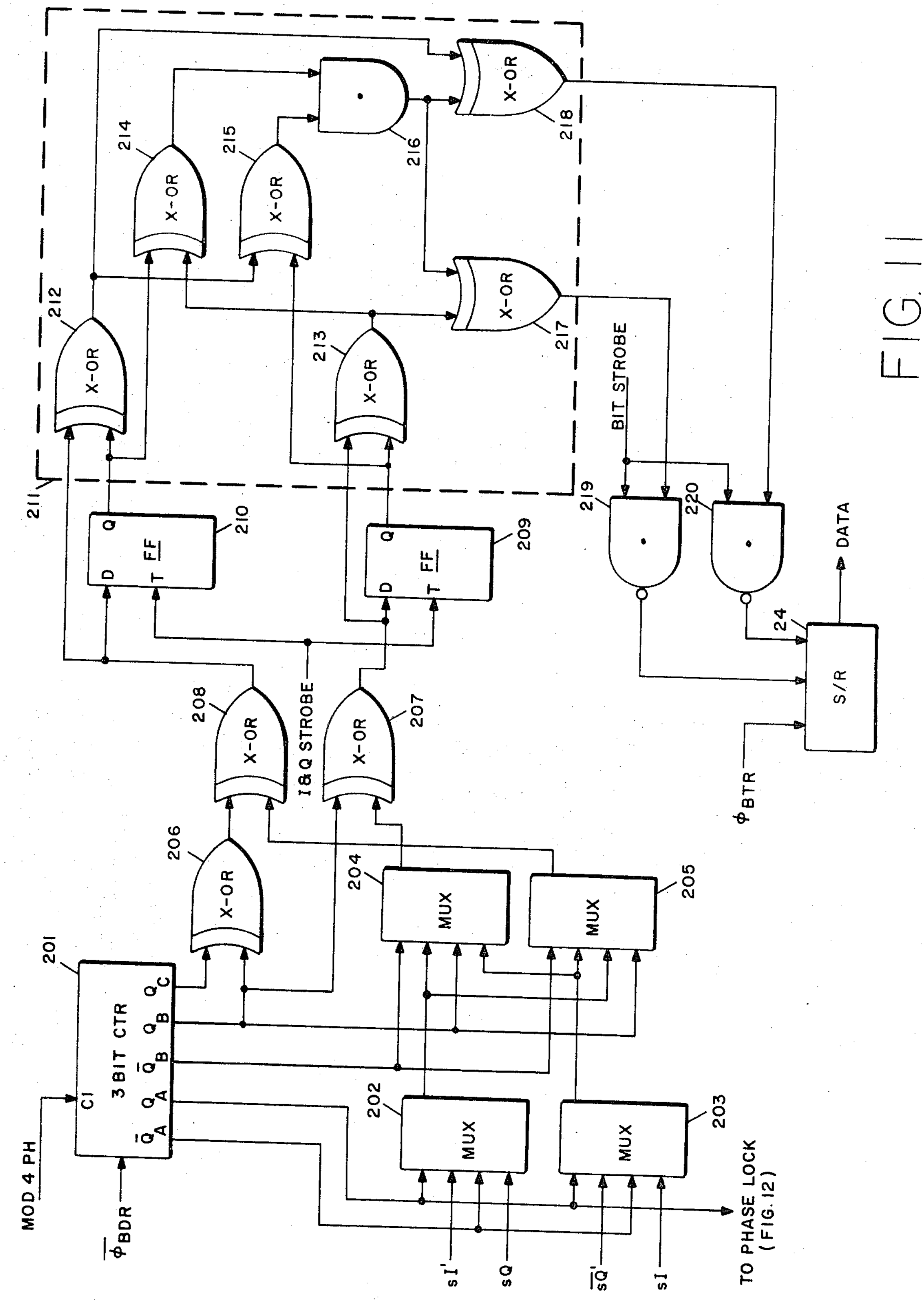
FIG. 11 is a block diagram, in part, and a logic schematic, in part, of a data decode network embodying the present invention.

To accomplish the foregoing, the data decode network 200 includes a digital phase shifting network which operates upon the sign values $sI'$, $sQ$, $\overline{sQ}'$ and $sI$ to phase shift the modified four phase vector $I+jQ$ by 45° so as to form its equivalent straight four phase $I+jQ$ vector. To this end, the data decoder network 200 is shown in FIG. 11 to include a three bit binary counter 201 which is enabled by the modified four phase mode signal to be clocked at the baud rate by the $\overline{O}_{BDR}$ signal. The outputs of the first, second and third stages of the counter are identified as $Q_A$, $Q_B$ and $Q_C$, respectively, with the complements $\overline{Q_A}$ and $\overline{Q_B}$ also being shown.

The eight states of the counter, which are cyclically generated in response to the baud clock $\overline{O}_{BDR}$, are employed to address a group of multiplexers 202 through 205 and a group of EXCLUSIVE OR gates 206, 207 and 208 which are all interconnected in such a manner as to generate the straight four phase $I-jQ$ equivalent vector for a modified four phase $I+jQ$ vector. To this end, the $\overline{Q_A}$ output of the counter is employed by the multiplexer (MUX) 202 to select the $sQ$ value and by the MUX 203 to select the $sI$ value. The $Q_A$ output of the counter is employed by the MUX 202 to select the $sI'$ value and by the MUX 203 to select the $\overline{sQ}'$ value. The $\overline{Q_B}$ output of the counters employed by the MUX 204 to select the output of the MUX 203 and by the MUX 205 to select the output of the MUX 202. The $Q_B$ output of the counter is employed by the MUX 204 to select the output of the MUX 202 and by the MUX 205 to select the output of the MUX 203. The $Q_B$ and $Q_C$ outputs of the counter are correlated in an EXCLUSIVE OR gate 206. Another EXCLUSIVE OR gate 207 correlates the output of the MUX 204 with the $Q_B$ output of the counter. Finally, an EXCLUSIVE OR gate 208 correlates the output of the MUX 205 with the output of the gate 206. The straight four phase $I+jQ$ vector equivalent appears at the output of the gates 207 and 208.

The manner in which the MUX 202 through 205 and EXCLUSIVE OR gates 206 through 208 respond to the count state addresses to generate the equivalent straight four phase $I+jQ$ vector is fully defined by Table I which lists the sign values which appear at the outputs of each of these multiplexers and EXCLUSIVE OR gates for the various states of the counter.

It is to be noted in the Table that the sign values $\overline{sI}$, $\overline{sI}'$, $\overline{sQ}$ and $\overline{sQ}'$ are the complements of $sI$, $sI'$, $sQ$ and $sQ'$, respectively. Since the counter steps through its states at the rate of 1 per baud, the outputs of EXCLUSIVE OR gates 207, 208 have the values shown in consecutive rows of TABLE I, during consecutive bauds.

TABLE I

| CTR states $Q_A$ $Q_B$ $Q_C$ | MUX 202 | MUX 203 | MUX 204 | MUX 205 | GATE 207 | GATE 208 |
|---|---|---|---|---|---|---|
| 000 | sQ | sI | Q | I | Q | I |
| 100 | sI | $\overline{sQ'}$ | I′ | $\overline{Q'}$ | I′ | $\overline{Q'}$ |
| 010 | sQ | I | I | Q | I | Q |
| 110 | sI′ | $\overline{Q'}$ | $\overline{Q'}$ | I′ | $\overline{Q'}$ | $\overline{I'}$ |
| 001 | sQ | I | Q | I | $\overline{Q}$ | $\overline{I}$ |
| 101 | sI′ | $\overline{Q'}$ | I′ | $\overline{Q'}$ | $\overline{I'}$ | Q′ |
| 011 | sQ | I | I | Q | $\overline{I}$ | Q |
| 111 | I′ | $\overline{Q'}$ | $\overline{Q'}$ | I′ | Q′ | I′ |

It should also be noted that during the straight four phase mode, the modified four phase control mode signal causes the counter to always have the count state of 000 such that the outputs of gates 207 and 208 are Q and I at all times.

The outputs of the EXCLUSIVE OR gates 207 and 208 are applied to the D inputs of flip flops 209 and 210, respectively. The flip flops 209 and 210 provide a temporary storage for one baud of the $I+jQ$ vector. To this end, these two flip flops each have their T input connected to receive the I and Q strobe. Thus, the $I$ and $Q$ values at the outputs of gates 207 and 208 are considered to represent the $I+jQ$ vector for a present baud while the values at the outputs of the Q outputs of flip flops 209 and 210 represent the $I+jQ$ vector from the most previous baud.

The outputs of the gate 207 and 208 and the Q outputs of flip flops 209 and 210 are applied to a decoding network 211 which acts to compare or detect the amount of phase change between the previous baud $I+jQ$ vector and the present baud $I+jQ$ vector. The decoding network 211 includes an EXCLUSIVE OR gate 212 which correlates the Q output of flip flop 210 with the output of gate 208 and another EXCLUSIVE OR gate 213 which correlates the Q output of flip flop 209 with the output of gate 207. An EXCLUSIVE OR gate 214 correlates the output of flip flop 210 with the output of gate 213. A further EXCLUSIVE OR gate 215 correlates the Q output of flip flop 209 with the output of gate 212. The outputs of gates 214 and 215 are ANDED together by means of an AND gate 216. The output of AND gate 216 is correlated in a first EXCLUSIVE OR gate 217 with the output of gate 213 and in a second EXCLUSIVE OR gate 218 with the output of gate 212. The decoder bit pair appears at the outputs of gates 217 and 218.

The operation of the network 211 in decoding the present baud and previous baud I and Q values is given by TABLE II which lists the possible permutations of the I and Q values in both the present and previous baud and the decoded bit pair associated with each permutation.

TABLE II

| Previous Baud IQ | Present Baud IQ | Bit Pair |
|---|---|---|
| 00 | 00 | 00 |
| 00 | 01 | 01 |
| 00 | 10 | 10 |
| 00 | 11 | 11 |
| 01 | 00 | 10 |
| 01 | 01 | 00 |
| 01 | 10 | 11 |
| 01 | 11 | 01 |

| | | |
|---|---|---|
| 10 | 00 | 01 |
| 10 | 01 | 11 |
| 10 | 10 | 00 |
| 10 | 11 | 10 |
| 11 | 00 | 11 |
| 11 | 01 | 10 |
| 11 | 10 | 01 |
| 11 | 11 | 00 |

The bit pair at the outputs of gates 217 and 218 is applied to a pair of NAND gates 219 and 220 which are enabled by the bit strobe to gate the complement so of the bit pair into a shift register 24. It is to be noted that the bit strobe occurs at the end of the sixth sample period of the baud which followed the baud at the end of which the I and Q strobe loaded the flip flops 209 and 210. The data bits are clocked out of the shift register 24 at the bit rate by the $O_{BDR}$ signal so as to provide a serial stream of data at its output.

What is claimed is:

1. A demodulator for detecting binary information which is encoded in successive bauds of a modulated carrier signal, said demodulator comprising sampling means for sampling said carrier signal to produce a stream of quantized carrier signal samples $f(zT)$, where $T$ is the sampling interval in the time domain and $-\infty \leqq z \leqq \infty$;

a discrete Fourier transform filter for filtering said $f(zT)$ samples to produce an $I+jQ$ product value for each value of $z$, where $I$ and $Q$ are the Fourier components;

means for rotating said $I$ and $Q$ Fourier components by $n\,\pi/4$ radians to produce I' and Q' components, where $n$ is an integer; and means responsive to said I, Q, I' and Q' components for adjusting the response of said filter to match the timing and phase of the carrier signal.

2. The invention as set forth in claim 1 and further including a timing network which produces a first timing signal;

wherein said filter includes means for producing local reference signals in response to said timing signal, means for multiplying said signal samples by said reference values to form product values, and means for accumulating said product values to form said $I+jQ$ product value for each value of $z$;

wherein said adjusting means adjusts the frequency of said first timing signal to synchronize the phase of the local reference signal with the carrier signal phase.

3. The invention as set forth in claim 2 wherein said adjusting means includes means for taking the modulo two sum of the signs of said I, Q, I' and Q' components during each baud; and means for adjusting said timing signal frequency in accordance with the value of said modulo two sum.

4. The invention as set forth in claim 1 and further including a timing network which produces a first timing signal;

wherein said filter responds to said first timing signal to produce said $I+jQ$ product value for each value of $z$; and wherein said adjusting means adjusts the frequency of said timing signal so as to achieve the match of the filter response to the timing and phase of the carrier signal.

5. The invention as set forth in claim 4 wherein said adjusting means includes means for taking the modulo two sum of the signs of said I, Q, I' and Q' components; and means for adjusting said timing signal frequency in accordance with the value of said modulo two sum.

6. Invention as set forth in claim 5 wherein said adjusting means further includes an averaging circuit which averages the modulo two sum values over a number of bauds so as to emit at its output a correction signal whenever the average attains either a maximum or minimum value; and means responsive to said averaging circuit output and to said modulo two sum during each baud to generate a code having a first value in the absence of said correction signal and either a second or a third value in response to said correction signal in accordance with the value of the modulo two sum which is in time coincidence with the correction signal; and wherein said timing network responds to said code to produce the first timing signal at a normal operating frequency for said first value and at relatively higher and lower frequencies in response to the second and third values, respectively.

7. The invention as set forth in claim 6 wherein said first timing signal is produced once during each sampling interval T and has a pulse width which is small compared to T;

wherein said code generating means responds to the absence of said first timing signal to generate said first code value and to the presence thereof to generate either said first, second or third values.

8. A demodulator for detecting binary information which is encoded in successive bauds of a modulated carrier signal, said demodulator comprising sampling means for sampling said carrier signal to produce a stream of quantized carrier signal samples $f(zT)$, where $T$ is the sampling interval in the time domain and $-\infty \leqq z \leqq \infty$;

a timing and synchronization network including an internal baud timing chain which periodically produces a baud timing signal at the baud rate of said carrier signal;

a discrete Fourier transform filter responsive to a first one of said timing signals for filtering said $f(zT)$ samples to produce an $I+jQ$ product value for each value of $z$, where $I$ and $Q$ are the Fourier components;

means for rotating said I and Q Fourier components by $n\,\pi/4$ radians to produce I' and Q' components, where n is an integer; and means responsive to said I, Q, I' and Q' components for synchronizing said internal baud timing chain with the bauds of the carrier signal.

9. The invention as set forth in claim 8 wherein said synchronizing network includes means responsive to the change in signs of either or both of the I and Q components and the I' and Q' components from one value of $z$ to the next so as to produce axis crossing signals;

means responsive to said baud timing signal and to said axis crossing signal to produce early and late pulses; and means responsive to said early and late pulses for advancing and retarding, respectively, the occurrence of said baud timing signal.

10. The invention as set forth in claim 9
wherein said internal baud timing chain includes
means for producing clock pulses at the sample rate; and
a bidirectional counting network responsive to said clock pulses to count in a first direction so as to divide the frequency of said pulses to produce said baud timing signal; and
wherein said means for advancing and retarding includes a gate responsive to each said early pulse to insert an additional pulse in the stream of said clock pulses and further includes a connection for coupling said late pulses to said counting network such that the counting network counts in the other direction in response thereto.

11. The invention as set forth in claim 10
wherein said means for producing early and late pulses includes first gating means responsive to said baud timing signal for producing early and late axis crossing signals;
an averaging network for averaging said early and late axis crossing signals over a number of values of $z$ so as to emit at its output either an early or a late correction signal whenever the average attains either a maximum or a minimum value; and
selection means operable to select either said early and late axis crossing signals or said early and late correction signals as said early and late pulses, respectively.

12. The invention as set forth in claim 11
wherein said selection means initially selects said early and late axis crossing signals for a predetermined number of bauds and thereafter normally selects the early and late correction signals.

13. The invention as set forth in claim 12
wherein said means for producing said axis crossing signals includes
means for detecting said charges in sign for each value of $z$;
storage means for storing each said detected change in sign for one sample interval T; and
means responsive to said detection means and said storage means for correlating the detected changes in sign for a current value of $z$ and the most previous value of $z$ so as to produce said axis crossing signals.

14. The invention as set forth in claim 9
wherein said means for producing said axis crossing signals includes
means for detecting said changes in sign for each value of $z$;
storage means for storing each said detected change in sign for one sample interval T; and
means responsive to said detection means and said storage means for correlating the detected changes in sign for a current value of $z$ and the most previous value of $z$ so as to produce said axis crossing signals.

15. The invention as set forth in claim 14
wherein said internal baud timing chain includes
means for producing clock pulses at the sample rate; and
a bidirectional counting network responsive to said clock pulses to count in a first direction so as to divide the frequency of said pulses to produce said baud timing signal; and
wherein said means for advancing and retarding includes a gate responsive to each said early pulse to insert an additional pulse in the stream of said clock pulses and further includes a connection for coupling said late pulses to said counting network such that the counting network counts in the other direction in response thereto.

16. The invention as set forth in claim 15
wherein said means for producing early and late pulses includes;
first gating means responsive to said baud timing signal for producing early and late axis crossing signals;
an averaging network for averaging said early and late axis crossing signals over a number of values of $z$ so as to emit at its output either an early or a late correction signal whenever the average attains either a maximum or a minimum value; and
selection means operable to select either said early and late axis crossing signals to said early and late correction signals as said early and late pulses, respectively.

17. The invention as set forth in claim 16
wherein said selection means initially selects said early and late axis crossing signals for a predetermined number of bauds and thereafter normally selects the early and late correction signals.

18. The invention as set forth in claim 8 and further including
a data decoding network responsive to the sign values of the I, Q, I′ and Q′ components for detecting and decoding the binary information encoded upon the modulated carrier signal.

19. The invention as set forth in claim 18
wherein said carrier signal modulation is four phase differentially coherent phase shift keying where the phase vectors have differential phases of plus or minus 45° or plus or minus 135°;
wherein said data decode network includes
a digital phase shifting network responsive to said baud timing signal to operate upon the sign values of the I, Q, I′ and Q′ components to phase shift the modified four phase vector $I+jQ$ by 45° so as to form its equivalent straight four phase $I + jQ$ vector, where straight four phase vectors have differential phases of 0°, 180° or plus or minus 90°;
a phase vector detection network which detects the differential phase of the equivalent $I+jQ$ vector from one baud to the next; and
decoding means responsive to the detected differential phase to form a bilevel signal indicative of the binary information encoded upon said modulated carrier signal.

20. The invention as set forth in claim 19
wherein said digital phase shifting network includes
a three stage binary counter responsive to said baud timing signal to cycle through its count values at the baud rate; and
a group of selection devices responsive to said count values to select the combination of said I, Q, I′ and Q′ sign values and/or their complements, which combination yields the equivalent $I + jQ$ straight four phase vector.

21. The invention as set forth in claim 20 and further including a temporary storage device which is arranged to be loaded in response to said baud timing signal when said sign values and which has its outputs coupled to said group of selection devices.

22. The invention as set forth in claim 7 wherein said carrier signal modulation is four phase differentially coherent phase shift keying.

23. The invention as set forth in claim 22 wherein said modulation is of the modified four phase type in which the phase vectors have differential phases of plus or minus 45° or plus or minus 135°; and wherein said adjusting means further includes means for complementing said modulo two sum during every other baud such that said adjusting means responds to the modulo two sum and its complement during alternate bauds.

24. The invention as set forth in claim 17 where said carrier signal modulation is four phase differentially coherent phase shift keying.

* * * * *

UNITED STATES PATENT OFFICE
CERTIFICATE OF CORRECTION

Patent No. 3,758,870 Dated September 11, 1973

Inventor(s) Joseph W. Schmitt et al.

It is certified that error appears in the above-identified patent and that said Letters Patent are hereby corrected as shown below:

| | |
|---|---|
| Column 3 line 17 | change "networds" to --networks-- |
| Column 4 line 2 | change "stem" to --step-- |
| Column 4 line 52 | After "output" insert --digital-- |
| Column 5 line 35 | Change "veery" to --every-- |
| Column 5 line 47 | After "carrier" insert --detect-- |
| Column 6 line 17 | change "other at the othe" to --is at the other-- |
| Column 6 line 56 | change "0IL" to --ØIL-- |
| line 57 | change "0IL" to --ØIL-- |
| line 58 | change "0IL" to --ØIL-- |
| line 59 | change "0IL" to --ØIL-- |
| line 60 | change "0IL" to --ØIL-- |
| line 61 | change "0" to -- Ø -- |
| line 68 | change "0IL" to --ØIL" |
| Column 7 line 10 | change "0IL" to --ØIL-- |
| line 15 | change "0IL" to -- ØIL-- |
| line 17 | change "0" to -- Ø-- |
| line 19 | change "02" to --Ø2-- |
| line 20 | change "02" to --Ø2-- |
| line 25 | change "0" to --Ø -- |
| line 28 | change "02L" to -- Ø2L-- |
| line 31 | change "02L" to --Ø2L-- |
| line 32 | change "cylce" to --cycle-- |
| line 33 | change "0" to --Ø-- |

UNITED STATES PATENT OFFICE

CERTIFICATE OF CORRECTION

Patent No. 3,758,870 Dated September 11, 1973

Inventor(s) Joseph W. Schmitt et al

It is certified that error appears in the above-identified patent and that said Letters Patent are hereby corrected as shown below:

Page 2

| | | |
|---|---|---|
| Column 7 | line 40 | change "$\overline{0}$" to --$\overline{\emptyset}$-- |
| | line 40 | change "$\overline{0IL}$ to --$\overline{\emptyset IL}$-- |
| | line 48 | change "0" to -- Ø -- |
| | line 51 | change "0" to -- Ø -- |
| | line 55 | after "time" first occurrence insert -- of --. |
| Column 7 | line 56 | change "0" to --Ø-- |
| | line 59 | change "0" to --Ø-- |
| Column 8 | line 49 | change "02" to --Ø2-- |
| Column 9 | line 3 | change "$\overline{0}$" to --$\overline{\emptyset}$-- |
| | line 14 | change "+Q" (second occurrance) to --Q-- |
| | line 19 | change "0" to --Ø-- |
| | line 24 | change "0" to --Ø-- |
| Column 10 | line 4 | After "s$\overline{Q}$" remove ")" |
| | line 19 | change "0" to --Ø-- |
| | line 22 | change "0" to --Ø-- |
| | line 23 | change "$\overline{0IL}$" to --$\overline{\emptyset IL}$-- |
| | line 32 | change "$\overline{0IL}$" to --$\overline{\emptyset IL}$-- |
| | line 35 | change "$\overline{0IL}$" to - $\overline{\emptyset IL}$-- |
| | line 38 | change "0IL" to -- ØIL -- |
| | line 39 | change "0I L" to --ØIL-- |
| | line 48 | change "$\overline{0IL}$ " to -- $\overline{\emptyset IL}$-- |

PO-1050
(5/69)

UNITED STATES PATENT OFFICE

CERTIFICATE OF CORRECTION

Patent No. 3,758,870 Dated September 11, 1973

Inventor(s) Joseph W. Schmitt et al

It is certified that error appears in the above-identified patent and that said Letters Patent are hereby corrected as shown below:

| | | |
|---|---|---|
| Column 11 line 10 | change "$\overline{02L}$" | to --$\overline{\emptyset 2L}$-- |
| line 10 | change "$\overline{02L}$" | to --$\overline{\emptyset 2L}$-- |
| line 12 | change "$\overline{02L}$" | to --$\overline{\emptyset 2L}$-- |
| line 15 | change "$\overline{02L}$" | to --$\overline{\emptyset 2L}$-- |
| line 18 | change "$\overline{02L}$" | to --$\overline{\emptyset 2L}$-- |
| line 27 | change "$\overline{0IL}$" | to --$\overline{\emptyset IL}$-- |
| line 31 | change "$\overline{0IL}$" | to --$\overline{\emptyset IL}$-- |
| line 35 | change "$\overline{0IL}$" | to --$\overline{\emptyset IL}$-- |
| line 43 | change "$0_{BTR}$" | to --$\emptyset_{BTR}$-- |
| line 45 | change "$0_{BDR}$" | to --$\emptyset_{BDR}$-- |
| line 46 | change "Th" | to --The-- |
| line 46 | change "$\overline{0}_{BDR}$" | to --$\overline{\emptyset}_{BDR}$-- |
| line 49 | change "$0_{BTR}$" | to --$\emptyset_{BTR}$-- |
| line 49 | change "$0_{BDR}$" | to --$\emptyset_{BDR}$-- |
| line 51 | change "$0_{BTR}$" and "$0_{BDR}$" | to $\emptyset_{BTR}$ and $\emptyset_{BDR}$-- |
| line 55 | change "$\overline{0}_{BDR}$, $\overline{0}_{BTR}$" | to --$\emptyset_{BDR}$, $\overline{\emptyset}_{BTR}$-- |
| Column 12 line 40 | change "$0_{BDR}$" | to --$\emptyset_{BDR}$-- |
| Column 13 line 16 | change "$\overline{0IL}$" | to -- $\overline{\emptyset IL}$ |
| line 31 | change "$\overline{0IL}$" | to -- $\overline{0IL}$-- |

156

PO-1050
(5/69)

UNITED STATES PATENT OFFICE
CERTIFICATE OF CORRECTION

Patent No. 3,758,870 Dated September 11, 1973

Inventor(s) Joseph W. Schmitt et al

It is certified that error appears in the above-identified patent and that said Letters Patent are hereby corrected as shown below:

| | | |
|---|---|---|
| Column 13 line 39 | change "$\overline{0I}L$" to --$\overline{ØI}L$-- | |
| line 56 | change "$\overline{0}$" to --Ø-- | |
| Column 14 line 27 | change "$\overline{02}L$" to --$\overline{Ø2}L$-- | |
| line 31 | change "$\overline{0I}L$" to --$\overline{ØI}L$-- | |
| line 32 | change "mide" to --mid-- | |
| line 33 | change "$\overline{02}L$" to --$\overline{Ø2}L$-- | |
| Column 16 line 2 | change "02L" to --Ø2L-- | |
| line 8 | change "02L" to --Ø2L-- | |
| line 10 | change "02L" to --Ø2L-- | |
| line 48 | before "state" insert --or the all 0's-- | |
| line 57 | change "02L" to --Ø2L -- | |
| Column 17 line 26 | change "$\overline{0}_{BDR}$" to --$Ø_{BDR}$-- | |
| line 31 | change "$\overline{0}_{BDR}$" to --$\overline{Ø}_{BDR}$-- | |
| line 44 | change "$Q_B$" to --$\overline{Q}_B$-- | |
| Column 19, line 17 | change "$0_{BDR}$" to --$Ø_{BDR}$-- | |
| Claim 13 column 21 line 39 | change "charges" to --changes-- | |
| Claim 16 column 22 line 20 | change "to" to -- or -- | |

Signed and sealed this 26th day of March 1974.

(SEAL)
Attest:

EDWARD M.FLETCHER,JR.
Attesting Officer

C. MARSHALL DANN
Commissioner of Patents

181